(12) United States Patent
Montalvo et al.

(10) Patent No.: US 12,129,562 B2
(45) Date of Patent: Oct. 29, 2024

(54) ELECTROLYZERS WITH BYPASSABLE BIPOLAR PLATES

(71) Applicant: Analog Devices, Inc., Wilmington, MA (US)

(72) Inventors: Antonio Montalvo, Raleigh, NC (US); Michael Alfred Kultgen, Denver, CO (US); Brian Harrington, Upton, MA (US)

(73) Assignee: Analog Devices, Inc., Wilmington, MA (US)

( * ) Notice: Subject to any disclaimer, the term of this patent is extended or adjusted under 35 U.S.C. 154(b) by 154 days.

(21) Appl. No.: 17/336,929

(22) Filed: Jun. 2, 2021

(65) Prior Publication Data

US 2022/0186390 A1    Jun. 16, 2022

Related U.S. Application Data

(60) Provisional application No. 63/183,880, filed on May 4, 2021, provisional application No. 63/123,682, filed on Dec. 10, 2020.

(51) Int. Cl.
*C25B 15/033*     (2021.01)
*C25B 1/04*       (2021.01)
(Continued)

(52) U.S. Cl.
CPC ............. *C25B 15/033* (2021.01); *C25B 1/04* (2013.01); *C25B 9/65* (2021.01); *C25B 9/70* (2021.01); *C25B 15/027* (2021.01)

(58) Field of Classification Search
CPC .. C25B 1/02–1/04; C25B 9/65; C25B 15/033; C25B 15/02
See application file for complete search history.

(56) References Cited

U.S. PATENT DOCUMENTS

| 4,069,118 A | 1/1978 | Hixson et al. |
| 4,197,169 A | 4/1980 | Bellows et al. |

(Continued)

FOREIGN PATENT DOCUMENTS

| CN | 1317787 C | 5/2007 |
| CN | 108258338 A | 7/2018 |

(Continued)

OTHER PUBLICATIONS

Lee et al ("Enhanced corrosion resistance and fuel cell performance of Al1050 bipolar plate coated with TiN/Ti double layer", Energy Conversion and Management, 75, 2013, p. 727-733). (Year: 2013).*

(Continued)

*Primary Examiner* — Alexander W Keeling
(74) *Attorney, Agent, or Firm* — Schwegman Lundberg & Woessner, P.A.

(57) ABSTRACT

Systems and methods are provided for operating an electrolyzer. The systems and methods include operations comprising: forming an electrical series connection through the plurality of electrolytic cells; bypassing a first electrolytic cell using bypass circuitry included in a first bipolar plate to electrically remove the first electrolytic cell from the electrical series connection while maintaining flow of current through a second of electrolytic cell; monitoring one or more parameters of the plurality of electrolytic cells; and generating, based on the one or more parameters, a model representing operating conditions of the electrolytic cells on an individual electrolytic cell basis.

20 Claims, 12 Drawing Sheets

(51) Int. Cl.
*C25B 9/65* (2021.01)
*C25B 9/70* (2021.01)
*C25B 15/027* (2021.01)

(56) References Cited

U.S. PATENT DOCUMENTS

| | | | |
|---|---|---|---|
| 4,390,763 A * | 6/1983 | Hruda | H01H 33/002 |
| | | | 204/267 |
| 5,879,826 A * | 3/1999 | Lehman | H01M 8/2457 |
| | | | 429/513 |
| 6,036,827 A | 3/2000 | Andrews et al. | |
| 6,332,434 B1 | 12/2001 | De Souza et al. | |
| 6,428,918 B1 | 8/2002 | Fuglevand et al. | |
| 6,618,681 B2 | 9/2003 | Hoenig et al. | |
| 6,620,538 B2 | 9/2003 | Bai et al. | |
| 7,038,424 B2 | 5/2006 | Adams et al. | |
| 7,560,179 B2 | 7/2009 | Tahara | |
| 8,115,454 B2 | 2/2012 | Faranda et al. | |
| 8,308,917 B2 | 11/2012 | Hinatsu et al. | |
| 8,940,243 B1 | 1/2015 | Fahimi | |
| 9,714,984 B2 | 7/2017 | Kim | |
| 9,746,526 B2 | 8/2017 | Fink | |
| 9,876,347 B2 | 1/2018 | Bousfield, III | |
| 10,005,372 B2 | 6/2018 | Lee | |
| 10,006,132 B2 | 6/2018 | Hahn et al. | |
| 10,260,157 B2 | 4/2019 | Blanchet et al. | |
| 10,283,974 B2 | 5/2019 | Macris | |
| 10,547,184 B2 | 1/2020 | Carralero et al. | |
| 2003/0091880 A1 | 5/2003 | Joos et al. | |
| 2004/0033398 A1 | 2/2004 | Kearl et al. | |
| 2006/0012334 A1 | 1/2006 | Watson | |
| 2006/0289312 A1 | 12/2006 | Tremblay et al. | |
| 2008/0121532 A1 * | 5/2008 | Gasda | H01M 16/00 |
| | | | 204/267 |
| 2009/0274937 A1 | 11/2009 | Labreche et al. | |
| 2010/0114395 A1 | 5/2010 | Hinatsu et al. | |
| 2012/0315509 A1 | 12/2012 | Gottmann et al. | |
| 2013/0317959 A1 * | 11/2013 | Joos | C25B 9/70 |
| | | | 205/637 |
| 2015/0024298 A1 * | 1/2015 | Blanchet | C25B 1/04 |
| | | | 429/432 |
| 2016/0336623 A1 | 11/2016 | Nayar et al. | |
| 2017/0352901 A1 | 12/2017 | Hartung et al. | |
| 2018/0261867 A1 | 9/2018 | Lee et al. | |
| 2020/0028227 A1 | 1/2020 | Mulder et al. | |
| 2020/0141013 A1 | 5/2020 | Garces | |
| 2020/0164763 A1 | 5/2020 | Holme | |
| 2020/0226482 A1 * | 7/2020 | Nagino | G06N 20/00 |
| 2021/0140057 A1 | 5/2021 | Utz | |
| 2021/0156039 A1 * | 5/2021 | Ballantine | C25B 15/021 |
| 2021/0216974 A1 | 7/2021 | Nagino | |
| 2021/0222309 A1 | 7/2021 | Berriah et al. | |
| 2021/0310136 A1 * | 10/2021 | Janáky | C25B 9/75 |
| 2022/0112612 A1 | 4/2022 | Montalvo et al. | |

FOREIGN PATENT DOCUMENTS

| | | |
|---|---|---|
| CN | 104737405 B | 8/2018 |
| CN | 108923082 A | 11/2018 |
| EP | 1786057 A2 | 5/2007 |
| EP | 1553654 B1 | 4/2014 |
| JP | 2005158264 A | 6/2005 |
| JP | 4879461 B2 | 12/2011 |
| JP | 2019110750 A | 7/2019 |
| KR | 101498760 B1 | 3/2015 |
| KR | 20190056170 A | 5/2019 |
| WO | 2019189501 | 10/2019 |

OTHER PUBLICATIONS

"U.S. Appl. No. 17/108,184, Non Final Office Action mailed Dec. 7, 2022", 20 pgs.

"U.S. Appl. No. 17/108,184, Response filed Feb. 28, 2023 to Non Final Office Action mailed Dec. 7, 2022", 9 pgs.

Alexe-Lonescu, A L, et al., "Current-Voltage Characteristics and Impedance Spectroscopy: Surface Conduction and Adsorption-Desorption Effects in Electrolytic Cells", The Journal of Physical Chemistry C, 124 (5), (2020), 3150-3158.

Bolton, W, "Chapter 1—Programmable Logic Controllers", Newnes, (2009), 1-19.

Mohammad, A, et al., "Impact of source resistance on duty ratio and output voltage of a DC to DC step down converter,", IEEE International Conference on Electrical, Computer and Communication Technologies (ICECCT), (2015), 1-4.

"U.S. Appl. No. 17/108,184, Advisory Action mailed Sep. 27, 2023", 6 pgs.

"U.S. Appl. No. 17/108,184, Final Office Action mailed Aug. 16, 2023", 24 pgs.

"U.S. Appl. No. 17/108,184, Non Final Office Action mailed Oct. 27, 2023", 28 pgs.

"U.S. Appl. No. 17/108,184, Response filed Sep. 5, 2023 to Final Office Action mailed Aug. 16, 2023", 9 pgs.

P, Millet N., et al., "Electrochemical performances of PEM water electrolysis cells and perspectives", International Journal of Hydrogen Energy, vol. 36, Issue 6, 2011, (Aug. 12, 2010), 4134-4142.

"APD7538: LC2MOS Microprocessor-Compatible 14-Bit DAC", Analog Devices, (2009), 16 pgs.

"U.S. Appl. No. 17/108,184, Final Office Action mailed Apr. 1, 2024", 33 pgs.

"U.S. Appl. No. 17/108,184, Response filed May 9, 2024 to Final Office Action mailed Apr. 1, 2024", 10 pgs.

"U.S. Appl. No. 17/108,184, Response filed Dec. 22, 2023 to Non Final Office Action mailed Oct. 27, 2023", 10 pgs.

"U.S. Appl. No. 17/108,184, Advisory Action mailed Jun. 6, 2024", 6 pgs.

"U.S. Appl. No. 17/108,184, Response filed Jun. 28, 2024 to Advisory Action mailed Jun. 6, 2024", 10 pgs.

* cited by examiner

ELECTROLYZERS WITH BYPASSABLE BIPOLAR PLATES

CLAIM FOR PRIORITY

The present application claims the benefit of priority to U.S. Provisional Application No. 63/123,682, filed Dec. 10, 2020 and U.S. Provisional Application No. 63/183,880, filed May 4, 2021, which are hereby incorporated by reference in their entireties.

FIELD OF THE DISCLOSURE

This document pertains generally, but not by way of limitation, to electrolysis cells.

BACKGROUND

Fuel cells are used to convert chemical energy (usually from hydrogen) to electrical energy. Since each fuel cell usually produces between 1 and 2 volts, oftentimes such fuel cells are stacked in series in order to produce a high power at a relatively low current. Hydrogen can also be generated with similar devices. Instead of hydrogen and oxygen as inputs and electrons as the desired output, the inputs are electricity and water and hydrogen is the desired output.

OVERVIEW

This disclosure describes, among other things, techniques for operating electrolysis cells.

In some embodiments, a system is provided that includes an electrolyzer comprising a plurality of electrolytic cells, each of the electrolytic cells comprising a plurality of bipolar plates. The system includes: a voltage converter coupled to form an electrical series connection through the plurality of electrolytic cells and configured to distribute power to the plurality of electrolytic cells, a first bipolar plate of the plurality of bipolar plates of a first electrolytic cell comprising bypass circuitry configured to electrically remove the first electrolytic cell from the electrical series connection while maintaining flow of current through a second electrolytic cell; and control circuitry coupled to the plurality of electrolytic cells, the control circuitry configured to: control the bypass circuitry to selectively electrically remove the first electrolytic cell from the electrical series connection; monitor one or more parameters of the plurality of electrolytic cells; and generate, based on the one or more parameters, a model representing operating conditions of the electrolytic cells on an individual electrolytic cell basis.

In some implementations, the one or more parameters of the system include at least one of voltage across one or more of the plurality of electrolytic cells, electro impedance spectroscopy (EIS), current, temperature, and gas or fluid flow associated with the one or more of the plurality of electrolytic cells.

In some implementations, the system includes an intermediate distribution device configured to provide an intermediate voltage to the voltage converter. In some implementations, the intermediate distribution device steps down a first high voltage to a second lower voltage.

In some implementations, the first electrolytic cell comprises a second bipolar plate of the plurality of bipolar plates, a cathode inlet and outlet, an anode inlet and outlet, one or more electrodes, one or more porous current collectors, a separator and a sealings portion. In such cases, the bypass circuitry is integrated into the first or second bipolar plates. In some implementations, the first or second bipolar plates further integrates at least one of a controller or a power device.

In some implementations, a resistance of the first bipolar plate is of a value that enables substantially uniform voltage across the first bipolar plate when the bypass circuitry is closed to allow current to flow directly from the first bipolar plate to a second bipolar plate.

In some implementations, the bypass circuitry is configured to electrically shunt at least a portion of current flowing through the first bipolar plate when the bypass circuitry is closed to allow current to flow directly from the first bipolar plate to a second bipolar plate, wherein the at least the portion of the current that is electrically shunted comprises alternating current used a stimulus for electro impedance spectroscopy (EIS).

In some implementations, the bypass circuitry comprises a plurality of switches distributed along a perimeter of the first bipolar plate. In some implementations, the first bipolar plate comprises a low-resistivity metal plated with a non-reactive metal. In some implementations, the low-resistivity metal comprises aluminum; and wherein the non-reactive metal comprises titanium.

In some implementations, the first bipolar plate comprises aluminum between titanium plates and one or more titanium plated vias forming connections between electrodes of the first bipolar plate.

In some implementations, the first bipolar plate is coupled to one or more conductors, wherein the bypass circuitry comprises one or more switches that, when closed, are configured to shunt current through the one or more conductors to electrically remove the first electrolytic cell from the electrical series connection.

In some implementations, a first of the electrolytic cells includes a first controller and a second of the electrolytic cells includes a second controller, wherein the first controller generates a model representing an operating condition of the first electrolytic cell based on one or more parameters of the first electrolytic cell.

In some implementations, the control circuitry is configured to apply a current set of parameters of a given electrolytic cell of the plurality of electrolytic cells to the model, wherein the model is configured to estimate health or performance of the given electrolytic cell based on the current set of parameters.

In some implementations, the model comprises a machine learning technique that is trained based on training data to predict health of an electrolytic cell, the training data comprising a plurality of training parameters and associated performance or failure information for the plurality of training parameters.

In some embodiments, method is provided for operating a system that includes an electrolyzer comprising a plurality of electrolytic cells, each of the electrolytic cells comprising a plurality of bipolar plates. The method includes: forming an electrical series connection through the plurality of electrolytic cells; bypassing a first electrolytic cell of the plurality of electrolytic cells using bypass circuitry included in a first bipolar plate of the plurality of bipolar plates to electrically remove the first electrolytic cell from the electrical series connection while maintaining flow of current through a second of electrolytic cell; monitoring one or more parameters of the plurality of electrolytic cells; and generating, based on the one or more parameters, a model representing operating conditions of the electrolytic cells on an individual electrolytic cell basis.

In some implementations, the method includes training a machine learning technique based on training data to predict health of an electrolytic cell, the training data comprising a plurality of training parameters and associated performance or failure information for the plurality of training parameters.

In some embodiments, an apparatus is provided for operating a system that includes an electrolyzer comprising a plurality of electrolytic cells coupled through an electrically series connection. The apparatus includes: a first bipolar plate implemented on a first of the plurality of electrolytic cells; bypass circuitry implemented on the first bipolar plate for electrically removing the first electrolytic cell from the electrically series connection while maintaining flow of current through a second cell of the plurality of electrolytic cells; and a second bipolar plate selectively coupled to the first bipolar plate through the bypass circuitry.

In some implementations, the bypass circuitry includes a processing element and wiring for connecting the first bipolar plate to the second bipolar plate selectively.

In some embodiments, a system is provided that operates with a renewable energy source, the system comprises: an electrolyzer couplable to the renewable energy source to distribute power from the renewable energy source to a plurality of electrolytic cells of the electrolyzer, each of the electrolytic cells comprising a plurality of bipolar plates coupled to form an electrical series connection through the plurality of electrolytic cells, the electrolyzer comprising bypass circuitry to electrically remove individual ones of the plurality of electrolytic cells from the electrical series connection while maintaining flow of current through remaining electrolytic cells; and control circuitry, coupled to the plurality of electrolytic cells and the renewable energy source, to dynamically adjust a stack size of the electrolyzer as a function of a hydrogen production rate of the electrolyzer and a maximum power point of the renewable energy source.

In some implementations, the bypass circuitry, when activated, electrically shunts at least a portion of current flowing through bipolar plates of a given one of the electrolytic cells when the bypass circuitry is closed to allow current to flow directly from between the bipolar plates.

In some implementations, the bypass circuitry comprises a plurality of switches distributed along a perimeter of a bipolar plate of each of the plurality of electrolytic cells.

In some implementations, the control circuitry: tracks the maximum power point of the renewable energy source over time; obtains a hydrogen production rate of the electrolyzer; determines electrolyzer health data associated with the electrolyzer; and selects a subset of the plurality of electrolytic cells to bypass using the bypass circuitry in order to adjust the stack size of the electrolyzer to increase the hydrogen production rate.

In some implementations, the control circuitry increases the hydrogen production rate in accordance with: increasing (H), $H=\eta(I)*I*V=I*V_{TH}$, where H is the hydrogen production rate, $\eta(I)$ is the electrolyzer stack efficiency as a function of current I, I is the electrolyzer stack current, V is the electrolyzer stack voltage, $V_{TH}$ is a thermoneutral voltage.

In some implementations, the control circuitry: determines a peak hydrogen production point; measures the hydrogen production rate of the electrolyzer at the peak hydrogen production point; and computes a difference between the hydrogen production rate of the electrolyzer at the peak hydrogen production point and a previous hydrogen production rate corresponding to a last change in the stack size of the electrolyzer.

In some implementations, the control circuitry: compares the difference to a first threshold and a change in current output by the renewable energy source to a second threshold; in response to determining that the difference is lower than the first threshold and that the change in current output by the renewable energy source is greater than the second threshold, increases the stack size of the electrolyzer; and in response to determining that the difference is lower than the first threshold and that the change in current output by the renewable energy source is lower than a negative of the second threshold, decreases the stack size of the electrolyzer.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
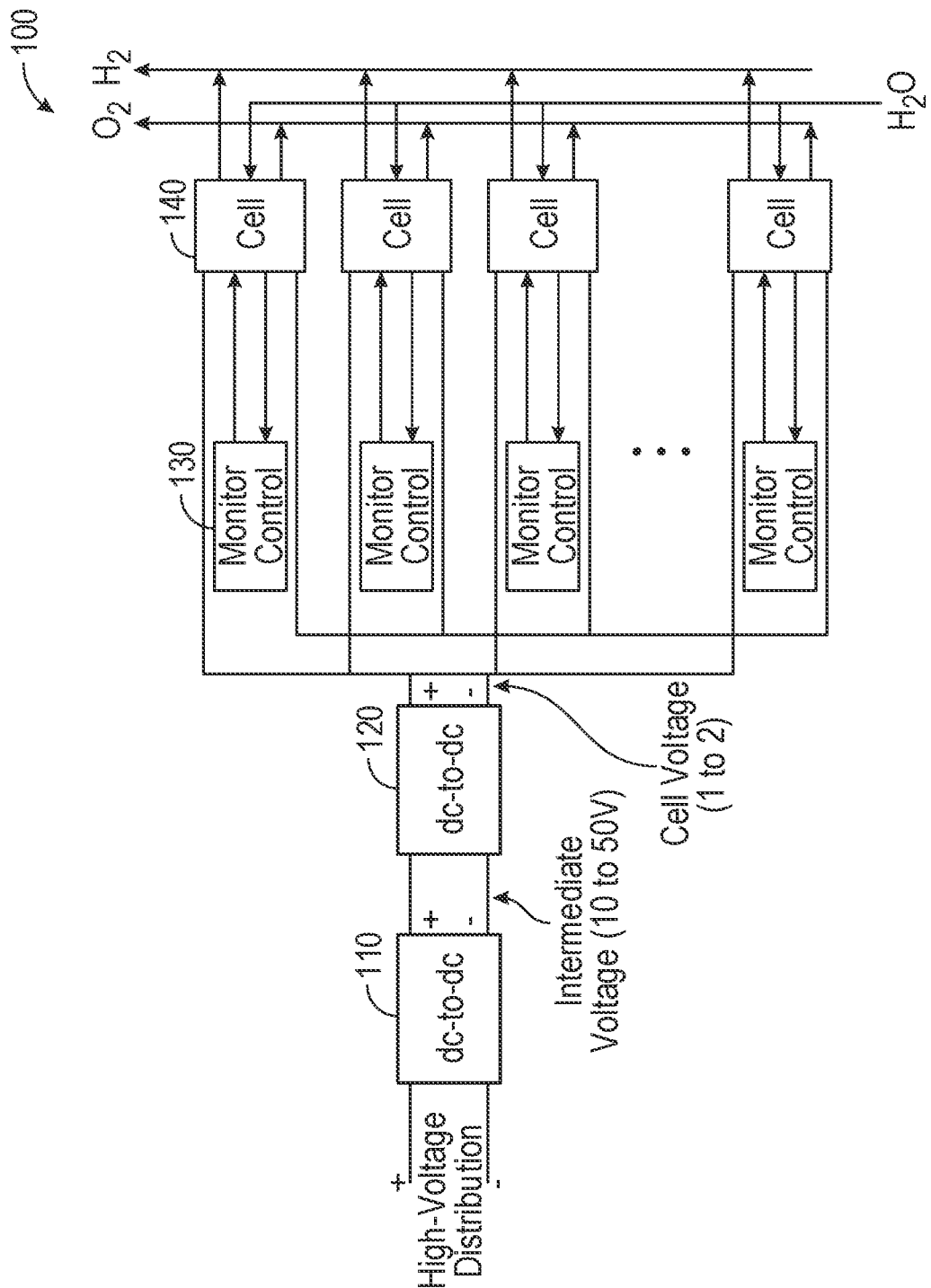
FIG. 1 is a block diagram of an example of an electrolyzer system including parallel connected electrolyzer cells, in accordance with various embodiments.

This disclosure describes, among other things, techniques to configure an electrolyzer or hydrolyzer to generate hydrogen and/or oxygen.

An electrolyzer typically includes one or more electrolytic cells. Each electrolytic cell has three component parts: an electrolyte and two electrodes (a cathode and an anode). The electrolyte is usually a solution of water or other solvents in which ions are dissolved. Molten salts such as sodium chloride are also electrolytes. When driven by an external voltage applied to the electrodes, the ions in the electrolyte are attracted to an electrode with the opposite charge, where charge-transferring (also called faradaic or redox) reactions can take place. Only with an external electrical potential (i.e., voltage) of correct polarity and sufficient magnitude can an electrolytic cell decompose a normally stable, or inert, chemical compound in the solution. The electrical energy provided can produce a chemical reaction, which would not occur spontaneously otherwise. Water, particularly when ions are added (salt water or acidic water), can be electrolyzed (subject to electrolysis). When driven by an external source of voltage, H+ ions flow to the cathode to combine with electrons to produce hydrogen gas in a reduction reaction. Likewise, OH− ions flow to the anode to release electrons and an H+ ion to produce oxygen gas in an oxidation reaction.

A system that generates hydrogen through electrolysis is called an electrolyzer or a hydrolyzer. A power generation system produces a high voltage (between 50V and 200V) and a high current (100 A to 4000 A) that is provided to a cell stack that includes electrolytic cells that each include an electrolyte and two electrodes. With water as the other input, the cell stack produces hydrogen and oxygen as outputs. If the source of power is a renewable such as solar, wind, or hydroelectric, then the entire cycle is completely carbon free. Electrolyzer cells are typically electrically connected in series. However, such configurations have several shortcomings. For example, one challenge of electrolyzers is durability. There is a specific voltage across a cell that produces an optimum combination of efficiency and durability. If the supply voltage is too high, corrosion in the electrodes can result in an increase in impedance and a shorter lifetime of the electrolyzers. The increase in impedance in one cell changes the voltage in other cells and can degrade efficiency and/or durability.

In addition, configuring the electrolyzers in series limits the scalability of the overall system, because adding or replacing electrolytic cells introduces additional challenges. For example, if one electrolytic cell in the electrolyzer breaks down, the power distribution through the system to other cells can be impacted and the overall system may also stop functioning. Namely, when the cells are in a series configuration, when one cell fails then the entire stack fails.

According to the disclosed embodiments, a novel and resource efficient approach to operating and configuring electrolyzers is provided. The disclosed approach configures cells of the electrolyzers through an electrical series connection and provides bypass circuitry on one or more plates of the electrolyzer to electrically remove any given cell from the electrical series connection while maintaining flow of current through remaining cells. In this way, performance on a per cell/bipolar plate basis can be managed, which can be used to control parameters of other cells/bipolar plates of the electrolyzer. Also, configuring the electrolytic cells in this manner makes the system highly scalable because adding cells to the system becomes trivial through the use of additional bypass circuitry, and when one cell/bipolar plate breaks down, that cell/bipolar plate can be electrically removed so that power distribution, such as voltage, delivered to other cells/bipolar plates can be maintained with minimal change. In some cases, the bypass circuitry, rather than electrically remove the cell from the series connection, reduces the current/voltage that flows between two cells. To do so, in some embodiments, the bypass circuitry includes multiple electronic connections and the bypass circuitry activates a particular portion of the electronic connections (e.g., closes a subset of switches) to reduce the overall current that flows from one bipolar plate of a given cell to another plate of the cell by shunting a portion of the current between the bipolar plates of the given cell.

In some examples, each cell is associated with a local monitoring system that includes an analog-to-digital converter (ADC). For example, the local monitoring system can be implemented on each individual cell, in which case each local monitoring system monitors its own individual cell performance. In other implementations, the local monitoring system is implemented by a central controller (in which case the local monitoring system is a central monitoring system) that communicates with each individual cell to obtain the performance measurement parameters. Specifically, the local monitoring system (or central monitoring system) measures one or more analog values to generate a set of one or more parameters in analog or digital form. The local/central monitoring system uses the set of one or more parameters to generate a model that represents the performance or failure of the associated cell and/or a collection of cells. The ADC implemented on the particular cell can measure voltages, currents, and temperature at various locations in the cell to generate the one or more parameters. The central monitoring system can gather one or more parameters from all of the cells in a system, or the central monitoring system can access data from many electrolyzer systems in the cloud.

In some cases, a central monitoring system, such as a server or control circuitry accessible over the Internet on the cloud, monitors the voltage and/or current across each cell, and the current, temperature, and/or other parameters such as gas and fluid flow. The information is used to monitor the performance of the system and to estimate the state-of-health of each cell on an individual basis. The performance and health estimation system may employ artificial intelligence or machine learning techniques (AI/ML) or other algorithmic techniques to process data from one or many cells. The AI/ML techniques can be trained to predict performance and/or failure on an individual cell basis based on training data. In this way, individual electrolytic cells can be bypassed or have their respective current/voltage reduced using their respective bypass circuitries to optimize performance and increase durability of the cell and electrolyzer system.

FIG. 1 is a block diagram of an example of an electrolyzer system 100 that includes cells coupled to each other in parallel, in accordance with various embodiments. Namely, in this embodiment, the cells are connected electrically in parallel and each cell is driven by a common voltage source. The electrolyzer system 100 includes a main high-voltage distribution device 110 configured to provide an intermediate voltage to the point-of-load voltage converter 120. For example, the high-voltage distribution device 110 can provide a voltage between 10 and 50 volts. The intermediate voltage converter 120 reduces (steps down) the voltage to a range of 1 volts and 2 volts.

The intermediate voltage converter 120 (common voltage converter) can generate a voltage between 1-2 volts and distribute that power to a plurality of electrolytic cells 140 in parallel. Each electrolytic cell 140 includes an electrolyte coupled to receive a solution (e.g., water) and two bipolar plates. The bipolar plates can be connected to the intermediate voltage converter 120. Each electrolytic cell 140 outputs oxygen and hydrogen. The rate of output depends on the power received by the bipolar plates of the cell. In some cases, a higher power can generate oxygen and hydrogen at a faster rate but this reduces durability of the system. On the other hand, a lower power can generate oxygen and hydrogen at a slower rate but increase durability of the system.

Each of the electrolytic cells 140 are coupled electrically in parallel to each other and to the intermediate voltage converter 120. A monitor control circuit 130 (e.g., a local monitor circuit) is associated with (and implemented by) each cell. The monitor control circuit 130 collects parameters of the respective cells 140 on an individual basis. For example, the monitor control circuit 130 associated with a first cell 140 implements an ADC to measure voltages across various cell components to collect any one or combination of parameters, including voltage across one or more of the plurality of electrolytic cells, electro impedance spectroscopy (EIS), current, temperature, and gas or fluid flow. In some cases, the monitor control circuit 130 includes a processor that implements a model for the respective cell that predicts or determines performance of the cell and/or predicts or determines a failure of the cell. The monitor control circuit 130 can disable the associated cell in response to determining that the current parameters are indicative and associated with an upcoming failure of the cell.

For example, a machine learning model can be trained based on training data to predict performance and/or failure of a given cell. This trained machine learning model can then be implemented by each monitor control circuit 130 to operate on and analyze real-time parameters measured and collected from the respective cell 140. As an example, the machine learning model may be a neural network. The neural network is trained to establish a relationship between a plurality of operating parameters (e.g., voltage across one or more of the plurality of electrolytic cells, EIS, current, temperature, and gas or fluid flow associated with the one or more of the plurality of electrolytic cells) and performance or failure. For example, one training data set can indicate that for a given set of parameters, the cell failed to operate within a threshold period of time. Another training data set can indicate that for a given set of parameters, another cell outputted hydrogen and oxygen at a particularly low level and could have outputted the hydrogen and oxygen faster without failing. The neural network can be trained to establish a set of parameters of the neural network based on such data to minimize a loss function. For example, the neural network can predict failure or performance metrics given a set of parameters in a set of the training data. The predicted failure or performance metrics can be compared with the actual ground truth failure or performance metrics of the set of training data. A loss can be computed based on a deviation between the predicted failure or performance metrics and the ground truth failure or performance metrics. Parameters of the neural network can then be updated based on the computed loss. Subsequent or additional training data sets can similarly be processed to update parameters of the neural network until a stopping criterion is satisfied or until all of the training data is processed.

This neural network with such updated parameters can then be stored or implemented by the monitor control circuits 130. In this way, when the neural network of a given monitor control circuit 130 is presented with a new set of parameters of a given cell 140, the neural network can predict failure or performance metrics of the given cell 140. Based on the failure or performance metrics, voltage being delivered to the individual cell 140 can be adjusted to optimize the failure or performance metrics.

In some cases, the monitor control circuit 130 of each cell 140 communicates the collected parameters to a cloud server over the Internet, such as a control circuitry. The cloud server can then use a global model (e.g., another neural network) to determine or predict the performance of the overall electrolyzer system 100 and can vary the voltage or power delivered to the system 100 or cell 140 by the high-voltage distribution device 110 and/or the intermediate voltage converter 120.

Figure 2:
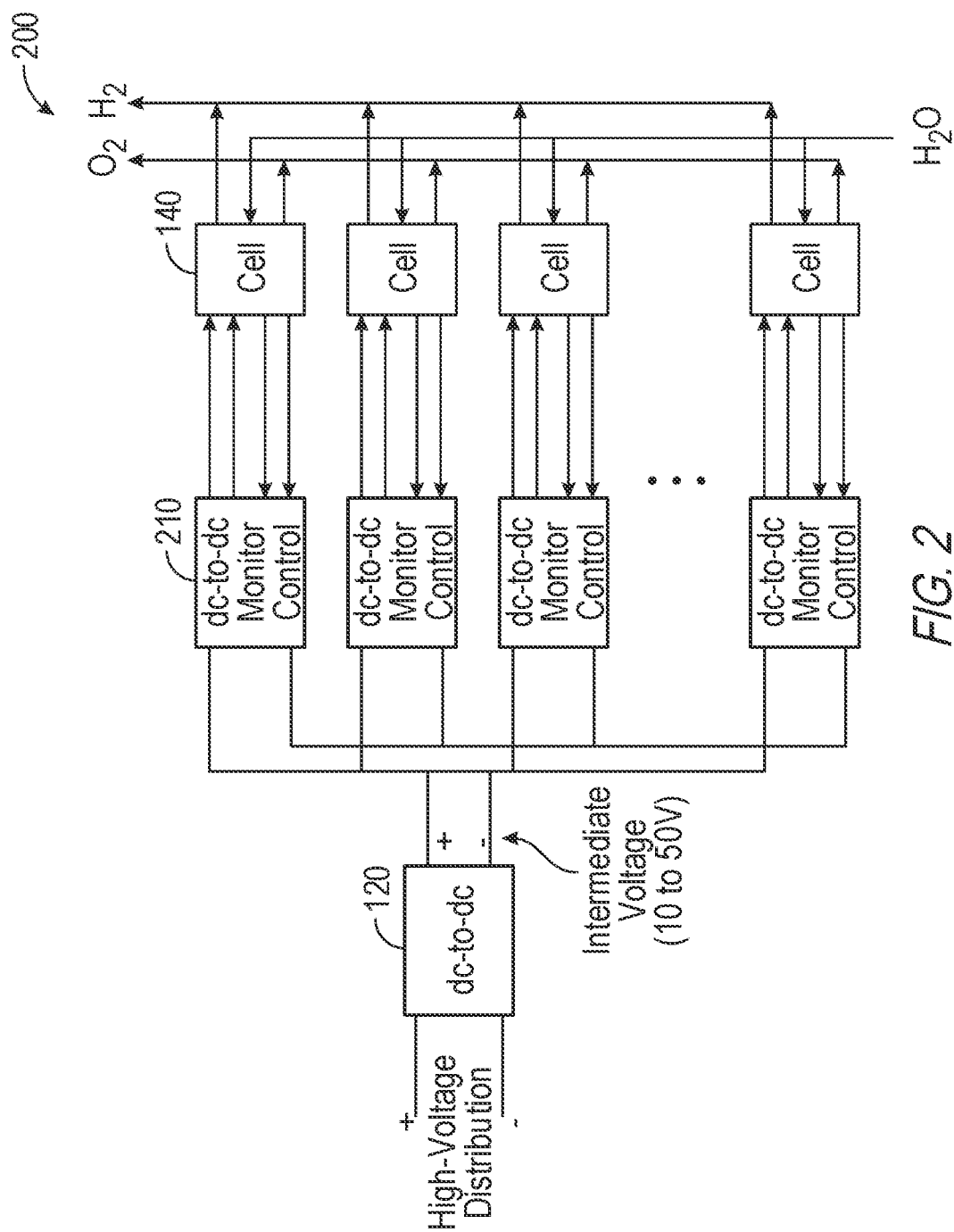
FIG. 2 is a block diagram of an example of an electrolyzer system including parallel connected electrolyzer cells, in accordance with various embodiments.

FIG. 2 is a block diagram of an example of an electrolyzer system 200, in accordance with various embodiments. The operation of electrolyzer system 200 is similar to that of electrolyzer system 100. Instead of delivering the same power and voltage to all of the electrolytic cells 140 in parallel, each electrolytic cell 140 includes an independent power supply and monitor control circuit 210. Specifically, the intermediate voltage converter 120 provides a voltage between 10 and 50 volts to each of the independent power supply and monitor control circuits 210 in parallel. The independent power supply and monitor control circuit 210 then converts the voltage of 10 and 50 volts to an individual supply voltage between 1 and 2 volts for the given cell. In this way, one of the cells 140 can receive and operate at a first voltage (e.g., 1 volts) while a second of the cells 140 can receive and operate at a different second voltage (e.g., 2 volts).

According to this configuration, when the monitor control circuit 210 of a given cell 140 predicts, based on measured parameters of the given cell 140, that the given cell 140 is being operated under conditions associated with an upcoming failure, the independent power supply and monitor control circuit 210 of the cell 140 can reduce the power and voltage being delivered to the corresponding cell 140 to increase the durability and lifetime of the cell or to temporarily disable operation of the cell 140. At the same time, when a given cell 140 is predicted by the associated monitor control circuit 210 to have parameters that indicate or are associated with a low performance, the independent power supply and monitor control circuit 210 of the cell 140 can increase the power and voltage being delivered to the corresponding cell 140 to increase the performance without reducing the durability and lifetime of the cell 140.

Figure 3:
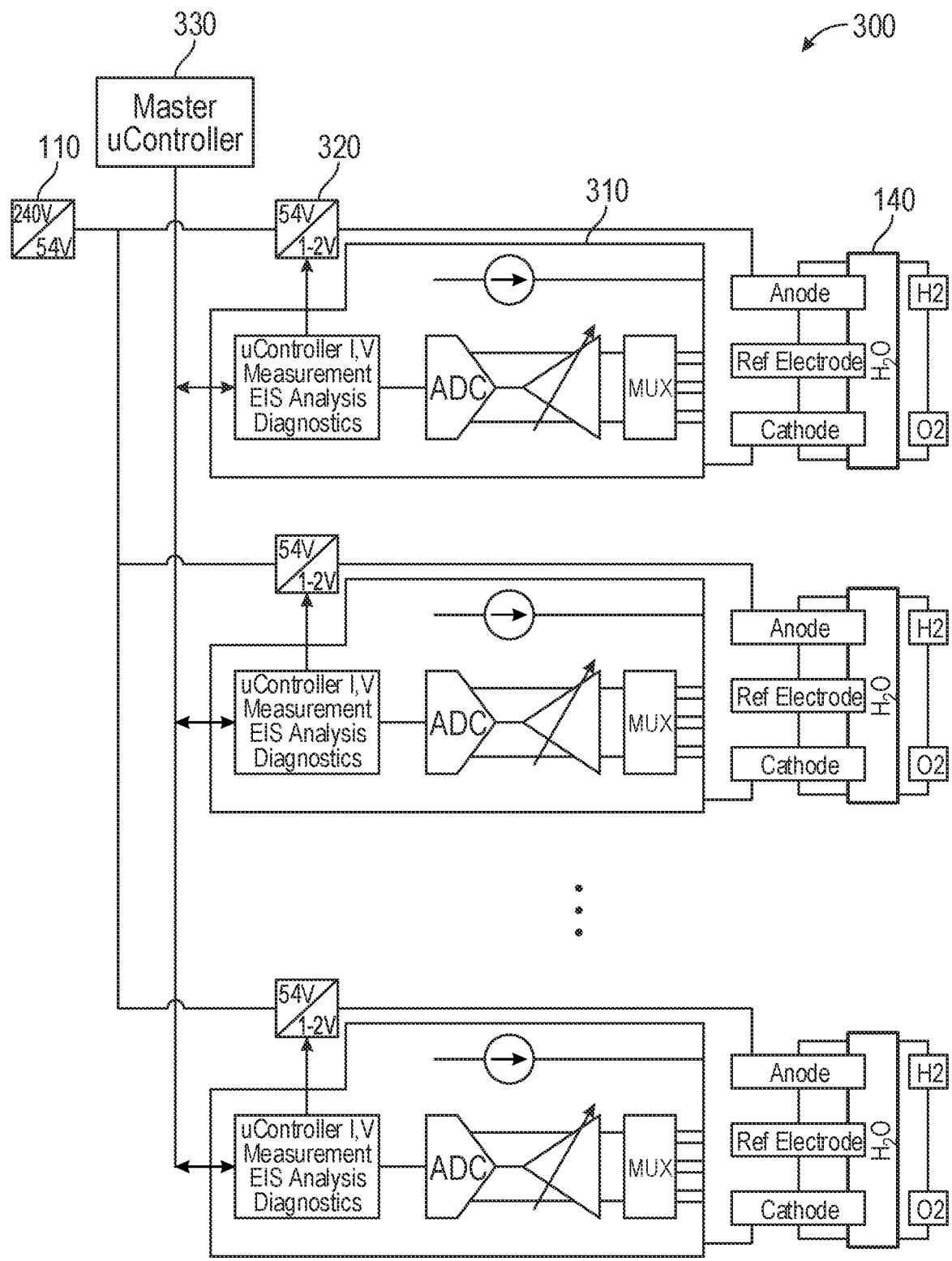
FIG. 3 is a block diagram of an example of an electrolyzer system including parallel connected electrolyzer cells, in accordance with various embodiments.

FIG. 3 is a block diagram of an example of an electrolyzer system 300, in accordance with various embodiments. Electrolyzer system 300 operates in a similar manner as electrolyzer system 200. As shown, each cell 140 is associated with a monitor circuit 310 and receives power from an individual power supply 320. Specifically, the individual power supplies 320 correspond to the individual power supplies of the monitor circuit 210 discussed in connection with FIG. 2. Namely, the individual power supplies 320 receive a voltage of between 10 and 50 volts that has been reduced from the 240 voltage generated by the high-voltage distribution device 110. The individual power supplies 320 convert the voltage of between 10 and 50 volts to an individual supply voltage between 1 and 2 volts for the given cell 140. This voltage is then applied to the anode of the cell 140.

The monitor circuit 310 associated with each respective cell 140 monitors parameters of the corresponding cell 140 and communicates such parameters to control circuitry 330, such as over the Internet. In one example, the monitor circuit 310 includes an ADC for generating the one or more parameters. The ADC can use a multiplexer to selectively measure voltages, currents, and temperature at various locations in the cell to generate the one or more parameters. In one example, the monitor circuit 310 can generate a local model for the associated cell based on the parameters of the cell it monitors. For example, the monitor circuit 310 can implement a machine learning model to analyze the one or more parameters to predict failure or performance of the cell and to thereby adjust the operating conditions of the cell 140 (e.g., increase the voltage generated by the individual power supply 320, decrease the voltage generated by the individual power supply 320, or temporarily disable the cell 140).

In some cases, the monitor circuit 310 provides the monitored and measured parameters to a remote control circuitry 330 (e.g., a central monitor circuit) that generates a model for the overall electrolyzer system 300. The model generated by the remote control circuitry 330 predicts or estimates performance, durability, and potential failure of the system 300 as a whole. The control circuitry 330 can control individual ones of the power supplies 320 to change the voltage and power being delivered to a given one of the cells 140 on an individual basis so that different voltage and power is delivered to the cells 140 in a way that maximizes durability and performance of the system 300.

The control circuitry 330 can use a communication protocol or interface to individually communicate with the monitor circuit 310 of each cell 140 on an individual basis (one at a time). The control circuitry 330 can also communicate an instruction to all of the monitor circuits 310 at the same time, such as to simultaneously increase power of all the cells 140 or decrease power of all the cells 140. This can be used to cause the cells 140 to generate oxygen and hydrogen faster or slower depending on the needs of the system 300.

In some embodiments, the control circuitry 330 is trained to model a performance and/or failure rate of cells 140 based on training data. For example, the control circuitry 330 may implement a neural network. The neural network is trained to establish a relationship between a plurality of operating parameters (e.g., voltage across one or more of the plurality of electrolytic cells, EIS, current, temperature, and gas or fluid flow associated with the one or more of the plurality of electrolytic cells) and performance or failure. For example, one training data set can indicate that for a given set of parameters, the cell failed to operate within a threshold period of time. Another training data set can indicate that for a given set of parameters, another cell outputted hydrogen and oxygen at a particularly low level and could have outputted the hydrogen and oxygen faster without failing. The neural network can be trained to establish a set of parameters of the neural network based on such data to minimize a loss function. For example, the neural network can predict failure or performance metrics given a set of parameters in a set of the training data. The predicted failure or performance metrics can be compared with the actual ground truth failure or performance metrics of the set of training data. A loss can be computed based on a deviation between the predicted failure or performance metrics and the ground truth failure or performance metrics. Parameters of the neural network can then be updated based on the computed loss. Subsequent or additional training data sets can similarly be processed to update parameters of the neural network until a stopping criterion is satisfied or until all of the training data is processed.

This neural network with such updated parameters can then be stored or implemented by the control circuitry 330 and/or by the individual monitor circuits 310. In this way, when the neural network is presented with a new set of parameters of a given cell 140 or a collection of cells 140, the neural network can predict failure or performance metrics of the given cell 140 or the collection of cells 140. Based on the failure or performance metrics, voltage being delivered to the overall system and/or to individual cells 140 can be adjusted to optimize the failure or performance metrics.

Each individual cell can be locally controlled by the monitor circuit 310 that implements a local version of the neural network. Namely, when the monitor circuit 310 measures a set of parameters using an ADC for a first cell, the monitor circuit 310 applies the measured parameters to the local neural network. The local neural network can provide an individual assessment of the performance and failure of the associated first cell. Based on the individual assessment generated by the neural network, the monitor circuit 310 associated with the first cell can increase the voltage applied to the cell, decrease the voltage applied to the cell, turn OFF the cell for a period of time (which may be indicated or estimated by the neural network), or generate an alert to a system operator.

Figure 4:
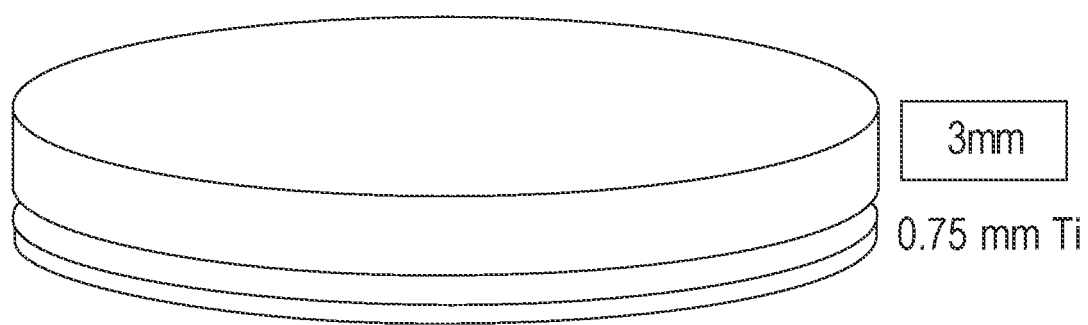
FIG. 4 is a block diagram of an example of a bipolar plate, in accordance with various embodiments.

FIG. 4 is a block diagram of an example of a bipolar plate (without the flow channels shown), in accordance with various embodiments. The electrolyzer system discussed in FIG. 4 above can implement the cells in a stack structure. In such a stack structure, the flow of current is vertical through the bipolar plates. According to some embodiments, the bipolar plates of each cell are configured such that voltage can be driven from a side of the bipolar plates. The bipolar plate shown in FIG. 4 is designed to enable voltage to be driven from a side of the bipolar plate.

Specifically, the bipolar plate can be made up of a high-conductivity material, such as aluminum, in addition to titanium. A low-resistivity metal, such as aluminum, for example, has 15 times the conductivity of titanium (a non-reactive metal) so it can be very thin. As explained below in connection with FIGS. 7A and 7B, if the connection is made along the perimeter of the bipolar plate to enable the voltage to be driven from a side of the bipolar plate, the aluminum portion of the bipolar plate can be 3 mm thick (represented by the top cylinder in FIG. 4). Aluminum is also much less expensive than titanium. Because these commodities are sold by weight, and because aluminum has 1/1.7 times the density of titanium and 1/2.8 times the price per weight of titanium, using aluminum for the bipolar plate reduces cost of constructing the electrolyzer system. This results in higher conductivity, for approximately $1/70^{th}$ of the cost of titanium for the same resistance in the bipolar plate.

In some embodiments, to prevent the aluminum from reacting with the water or other elements in the electrolyzer system (which reduces reliability), the aluminum portion of the bipolar plate can be plated with titanium. Alternatively or in addition, the aluminum portion of the bipolar plate could be sandwiched between thin titanium plates. In such cases, vias can be used to connect the two titanium plates that sandwich the aluminum. The vias can be either titanium plated or protected with some other material. For example, the bipolar plate can be constructed such that a first portion includes a titanium plate having a relatively small thickness. A second portion can include a relatively thick aluminum portion that is placed on top of the first portion. A third portion of the bipolar plate can include another titanium plate having a relatively small thickness. Namely, the second portion can be thicker than the first and third portions. A via or other electrical connection that is plated with titanium can be formed between the first and third plates. Alternatively or in addition, a less reactive, highly conductive material (metal) can be used in place of aluminum to form the bipolar plate.

In some cases, some of the bipolar plates for a first portion of the cells of the electrolyzer can be formed according to a first manner (e.g., in which an aluminum portion of the bipolar plate is plated with titanium). A remaining portion of the bipolar plates of a second portion of the cells of the electrolyzer can be formed according to a second manner (e.g., an aluminum portion of the bipolar plate being sandwiched between thin titanium plates with connecting vias).

The bipolar plates discussed in connection with FIGS. 5-8 below can be formed in the same manner as discussed in connection with FIG. 4.

Figure 5A:
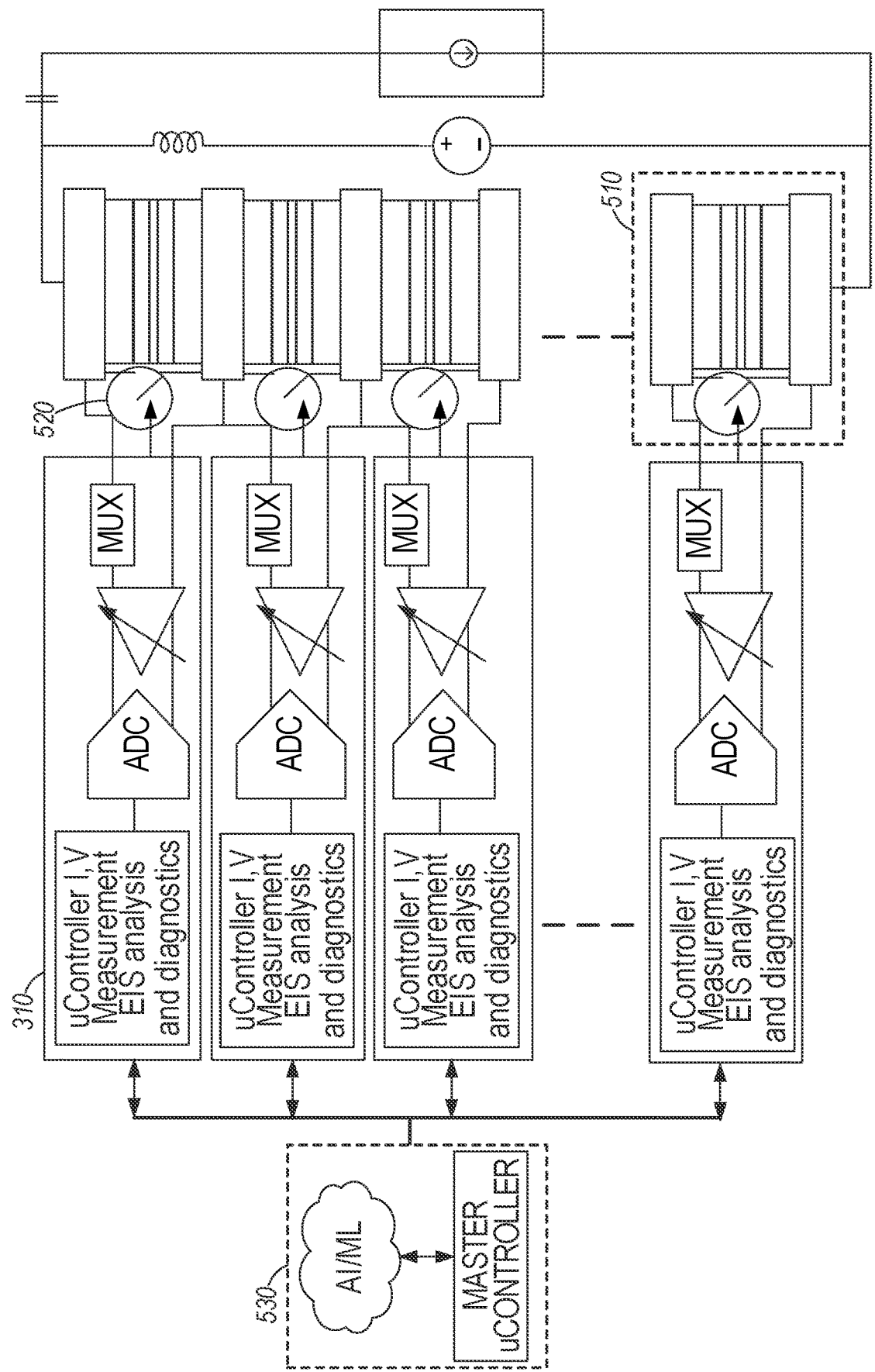
FIG. 5A is a block diagram of an example of an electrolyzer system including series connected electrolyzer cells, in accordance with various embodiments.
Figure 5B:
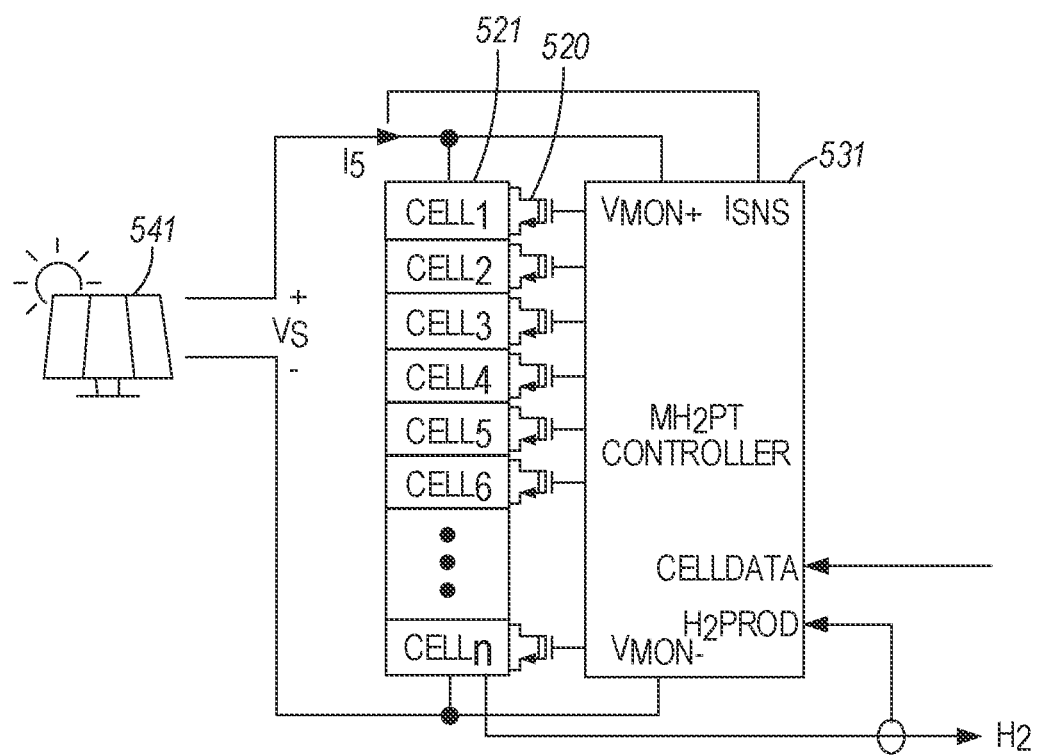
FIG. 5B is a block diagram of an example of an electrolyzer system including series connected electrolyzer cells coupled to a solar photovoltaic cell (PV), in accordance with various embodiments.

An alternative to providing a unique power supply to each cell, as discussed in the parallel configuration of the cells in FIGS. 1-3, the cells can be electrically connected in series and include or be associated with bypass circuitry, as shown in FIG. 5A and FIG. 5B. Specifically, FIG. 5A is a block diagram of an example of an electrolyzer system 500 including series connected electrolyzer cells 510, in accordance with various embodiments.

According to the embodiment shown in FIG. 5A, characteristics of each cell 510 can be monitored by monitor circuit 310 in a similar manner as discussed above in connection with FIGS. 1-3. Specifically, each cell 510 can be associated with a given monitor circuit 310, which controls the bypass circuitry of a given cell 510 to electrically remove completely or partially the given cell 510 from the series connection. The electrolyzer system 500 can also include a centralized controller 530, which can receive data from each of the monitor circuits 310 associated with each cell 510. As discussed above, the centralized controller 530 and/or the individual monitor circuits 310 can together or individually implement a machine learning model that predicts cell/electrolyzer behavior and likelihood of failure. The parameters being monitored by the centralized controller 530 and/or the individual monitor circuits 310 could include the cell 510 voltage at a variety of points on the bipolar plate, the temperature, and plant-wide parameters such as water and gas flow, among others discussed above. These parameters can be used to create the machine learning model of the state-of-health of each cell 510 and/or the electrolyzer system 500. The parameters may come from just the system 500 being monitored or from many electrolyzer systems 500 connected via the Internet, as discussed above.

The machine learning model can be used to predict failures so that a cell that is about to fail can be bypassed (temporarily or permanently) before it fails. This is valuable because at least one failure mode (pin holes in the membrane which allows hydrogen and oxygen to mix) would bring down the entire stack even if the cell was bypassed.

Specifically, the monitor circuit 310 associated with each respective cell 510 monitors parameters of the corresponding cell 510 and communicates such parameters to the centralized controller 530, such as over the Internet. In one example, the monitor circuit 310 includes an ADC for generating the one or more parameters. The ADC can use a multiplexer to selectively measure voltages, currents, and temperature at various locations in the cell 510 to generate the one or more parameters. In one example, the monitor circuit 310 can generate a local model for the associated cell 510 based on the parameters of the cell 510 it monitors. For example, the monitor circuit 310 can implement a machine learning model to analyze the one or more parameters to predict failure or performance of the cell 510 and to thereby adjust the operating conditions of the cell 510 (e.g., completely or partially bypass the cell 510 using its respective bypass circuitry 520).

In some cases, the monitor circuit 310 provides the monitored and measured parameters to the centralized controller 530 (e.g., a central monitor circuit) that generates a model for the overall electrolyzer system 500. The model generated by the centralized controller 530 predicts or estimates performance, durability, and potential failure of the electrolyzer system 500 as a whole. The centralized controller 530 can control individual ones of the bypass circuitries 520 to selectively bypass one or more sets of cells 510 from the series connection of cells 510 in a way that maximizes durability and performance of the electrolyzer system 500.

The centralized controller 530 can use a communication protocol or interface to individually communicate with the monitor circuit 310 of each cell 510 on an individual basis (one at a time). The control circuitry 330 can also communicate an instruction to all of the monitor circuits 310 at the same time.

In some embodiments, the centralized controller 530 is trained to model a performance and/or failure rate of cells 510 based on training data. For example, the centralized controller 530 may implement a neural network. The neural network is trained to establish a relationship between a plurality of operating parameters (e.g., voltage across one or more of the plurality of electrolytic cells, EIS, current, temperature, and gas or fluid flow associated with the one or more of the plurality of electrolytic cells 510) and performance or failure. For example, one training data set can indicate that for a given set of parameters, the cell failed to operate within a threshold period of time. Another training data set can indicate that for a given set of parameters, another cell outputted hydrogen and oxygen at a particularly low level and could have outputted the hydrogen and oxygen faster without failing. The neural network can be trained to establish a set of parameters of the neural network based on such data to minimize a loss function. For example, the neural network can predict failure or performance metrics given a set of parameters in a set of the training data. The predicted failure or performance metrics can be compared with the actual ground truth failure or performance metrics of the set of training data. A loss can be computed based on a deviation between the predicted failure or performance metrics and the ground truth failure or performance metrics. Parameters of the neural network can then be updated based on the computed loss. Subsequent or additional training data sets can similarly be processed to update parameters of the neural network until a stopping criterion is satisfied or until all of the training data is processed.

This neural network with such updated parameters can then be stored or implemented by the centralized controller 530 and/or by the individual monitor circuits 310. In this way, when the neural network is presented with a new set of parameters of a given cell 510 or a collection of cells 510, the neural network can predict failure or performance metrics of the given cell 510 or the collection of cells 510. Based on the failure or performance metrics, bypass circuitries 520 of respective cells can be activated to bypass or completely or partially remove the associated cell 510 from the electrical series connection of cells 510.

Each individual cell can be locally controlled by the monitor circuit 310 that implements a local version of the neural network. Namely, when the monitor circuit 310 measures a set of parameters using an ADC for a first cell, the monitor circuit 310 applies the measured parameters to the local neural network. The local neural network can provide an individual assessment of the performance and failure of the associated first cell. Based on the individual assessment generated by the neural network, the monitor circuit 310 associated with the first cell 510 can activate the bypass circuitry 520 of the first cell 510 to electrically completely or partially remove the cell 510 from the electrical series connection of cells 510, such as for a period of time (which may be indicated or estimated by the neural network), or generate an alert to a system operator.

In some cases, for bypassing a given cell 510, the current can be shunted across the cell 510 using respective bypass circuitry 520 of the cell 510. The bypass circuitry 520 forms an electrical connection directly between the two bipolar plates of a given cell 510 when the bypass circuitry is activated. Namely, to bypass or remove the cell 510 from an electrical series connection with other cells 510, one or more switches included in the bypass circuitry 520 are closed to directly connect the two bipolar plates of the cell 510. To reconnect the cell to the series connected cells 510, the one or more switches of the bypass circuitry 520 are opened to cause current to flow through other components of the cell 510 between the two bipolar plates. The closing of the one or more switches bypasses the other components of the cell 510, which effectively electrically removes the cell from the series connection of cells 510.

In some cases, the bipolar plate's "horizontal" resistance is configured to be small enough for there to be a substantially uniform voltage across the bipolar plate. In some examples, it may not be necessary for all of the current to be shunted. Namely, if a cell is beginning to fail, a portion of the current could be shunted to reduce the voltage across the cell and slow its aging. To shunt only a portion of the current, a plurality of switches can be disposed around the bipolar plate and only some of the plurality of switches may be closed. This causes some of the current to be shunted and directly flow from one bipolar plate to another while other portions of the current flow through other components of the cell between the bipolar plates. Namely, the switches can be controlled such that they behave as variable resistors and thus shunt some of the current. This allows each cell to have a unique voltage, as discussed in FIGS. 1-3, with each cell having a unique power supply.

In some cases, the switches are implemented as transistors that implement a variable resistor. This allows the switch to be in a state which is neither opened or closed but something in between to allow the amount of current that is shunted to be variable. When the switch is implemented in a variable resistance mode, the switch can be used to generate an EIS stimulus. In this case, the switch's (or variable resistor's) control terminal can be modulated to shunt some portion of the current at a desired frequency.

FIG. 5B is a block diagram of an example of an electrolyzer system 501 including series connected electrolyzer cells coupled to a solar PV, in accordance with various embodiments. While the disclosed embodiments are discussed in connection with a solar PV, any other suitable renewable energy source can be provided in addition to or in place of the solar PV. Namely, rather than providing power to the electrolytic cells of the electrolyzer from a carbon based fossil fuel power source, power to the electrolyzer 501 is provided from a renewable energy source, such as a solar PV.

Providing power to an electrolyzer from a renewable energy source is not trivial. Renewable energy sources typically provide power that varies over time, such as based on wind changes or available solar energy. Because the power varies over time, the efficiency of hydrogen production of the electrolyzer is difficult to predict and control. Certain systems use available AC-DC rectifiers and DC-AC inverters (or a DC-DC converter) in an attempt to balance and make the variable power that is provided to the electrolyzer more constant. However, using such additional components not only increases the cost of such systems but also reduces the overall efficiency of hydrogen production.

The electrolyzer system 501 provides a more optimized solution to powering an electrolyzer with a renewable energy source that employs a method for controlling an electrolyzer stack with bypass circuitry coupled to the cells. The disclosed approach leads to lower cost and other advantages, such as increased hydrogen production efficiency. The goal of the power system shown in FIG. 5B is to extract the maximum power from the solar PV array (the renewable energy source) and transfer that power to the electrolyzer while keeping the electrolyzer operating in a safe and efficient manner. According to the disclosed approach, the electrolyzer can be power by a renewable energy source without the need for a power conversion stage (e.g., AC-DC rectifiers and DC-AC inverters or DC-DC converters).

The electrolyzer system 501 includes electrolyzer 521 with bypass circuitry 520 that enables bypassing individual ones of the cells of the electrolyzer 521. The electrolyzer 521 includes some or all of the components of cell 510 (FIG. 5A). As an example, the electrolyzer 521 includes a plurality of electrolytic cells, each of the electrolytic cells comprising a plurality of bipolar plates coupled to form an electrical series connection through the plurality of electrolytic cells. The bypass circuitry 520 is configured to electrically remove individual cells or groups of the plurality of electrolytic cells of the electrolyzer 521 from the electrical series connection while maintaining flow of current through remaining electrolytic cells.

The electrolyzer 521 is coupled to receive power from a renewable energy source 541 (e.g., a solar PV array). A controller 531 monitors the voltage and current supplied by the renewable energy source 541 and calculates the power generated by the renewable energy source 541. The controller 531 may include some or all of the components of monitor circuit 310 and/or centralized controller 530. The controller 531 may receive or derive information about the hydrogen production rate of the electrolyzer 521 and information about the state-of-health (SOH) of individual cells of the electrolyzer 521 (e.g., using machine learning techniques discussed above). With the information collected, the controller 531 activates/deactivates switch elements of the bypass circuitry 520 to selectively electrically remove individual cells or groups of cells of the electrolyzer 521 from the electrical series connection. The algorithm for activating the switch elements of the bypass circuitry 520 can be optimized for maximizing hydrogen production, extending the useful life of the electrolyzer, and assuring safe operation.

In one example, maximum power is extracted from renewable energy source 541 when the load connected to the renewable energy source 541 draws power at a current/voltage operating point referred to as the maximum power point. A series of I-V curves of a renewable energy source 541, along with the maximum power points can be determined.

The series of I-V curves shows the power that can be delivered by the renewable energy source 541 along the possible current and voltage operating points as a function of the renewable energy, such as solar irradiance (G) impacting a solar module.

According to the disclosed embodiments, the controller 531 adjusts a size of the electrolyzer to sweep a curve that maximizes use of the maximum power point of the renewable energy source 541. In some cases, when all cells are bypassed, the electrolyzer stack has an effective length of 0 cells and looks like a short circuit. The controller 531 can set the effective length to 0 cells to provide a short circuit when the power output by the renewable energy source 541 is less than a threshold. As the power output by the renewable energy source 541 starts to exceed the threshold, the controller 531 adds more cells to the stack to increase the length and size of the electrolyzer stack to follow a curve towards the highest impedance load, which corresponds to the maximum stack length where none of the cells are bypassed. After the power output by the renewable energy source 541 reaches the maximum power point and begins to drop, the controller 531 again adjusts the size to reduce the size of the electrolyzer stack. In this way, the controller 531 dynamically changes the number of cells of an electrolyzer that are bypassed or active, to vary a load presented to the to the renewable energy source 541 in a way that is very close to the maximum power point of the renewable energy source 541.

In some cases, the effective stack length can be adjusted to maximize power extracted from the renewable energy source 541. In some cases, the effective stack length can be adjusted to maximize hydrogen production by the electrolyzer 521. The efficiency of the electrolyzer 521 varies with current. As such, maximizing power (P) means maximizing, $P=I*V$, while maximizing hydrogen production means maximizing (H), $H=\eta(I)*I*V=I*V_{TH}$, where H is hydrogen production rate $\eta(I)$ is the electrolyzer stack efficiency as a function of current I, I is the electrolyzer stack current, V is the electrolyzer stack voltage, and $V_{TH}$ is the thermoneutral voltage.

In one example, the controller 531 controls the bypass circuitry 520 to vary the length/size of the electrolyzer 521 by measuring initially a peak hydrogen production point. The controller 531 measures the current rate of hydrogen production at a given time, such as by measuring the flow rate of the hydrogen produced, or indirectly by measuring the current and voltage consumed by the electrolyzer 521 and calculating the rate of hydrogen production in accordance with $H=\eta(I)*I*V$. The controller 531 can then compute a difference between the current rate of hydrogen production and the hydrogen production rate at a previous time when the stack size of the electrolyzer 521 was changed. Namely, the controller 531 can store the rate of hydrogen product at a particular time when the controller 531 increases or decreases the size of the electrolyzer 521 by bypassing or not bypassing individual cells or groups of cells of the electrolyzer 521 using the bypass circuitry 520. The controller 531 can also store the value of the current output by the renewable energy source 541 and received by the electrolyzer 521 at the time the controller 531 increases or decreases the size of the electrolyzer 521.

At some predetermined or period point in the future, the controller 531 measures the current hydrogen production rate and computes a difference between the current hydrogen production rate and the previously stored hydrogen production rate. The controller 531 can compare the difference between the current hydrogen production rate and the previously stored hydrogen production rate to a first threshold, such as $-\epsilon_1$. The controller 531 can also determine the value of the current presently being output by the renewable energy source 541 and received by the electrolyzer 521 and compare that value of the current to the previously stored value of the current when the last time the electrolyzer 521 size was changed. The controller 531 compares the difference between the two values of the current to a second threshold, such as $\epsilon_2$. The controller 531 can increase the effective stack size of the electrolyzer 521 by deactivating one or more switches of the bypass circuitry 520 (so as to not shunt the current from one bipolar plate to another bipolar plate of corresponding cells) in response to determining that the difference between the current hydrogen production rate and the previously stored hydrogen production rate is less than the first threshold and in response to determining that the difference between the two values of the current is greater than the second threshold. This may be indicative of a situation in which hydrogen production is decreasing while current provided by the renewable energy source 541 is increasing. In this situation, the controller 531 increases the size of the electrolyzer 521 to increase production of hydrogen.

The controller 531 can decrease the effective stack size of the electrolyzer 521 by activating one or more switches of the bypass circuitry 520 (so as to shunt the current from one bipolar plate to another bipolar plate of corresponding cells) in response to determining that the difference between the current hydrogen production rate and the previously stored hydrogen production rate is less than the first threshold and in response to determining that the difference between the two values of the current is less than the second threshold or less than a negative of the second threshold (e.g., a third threshold). This may be indicative of a situation in which hydrogen production is decreasing while current provided by the renewable energy source 541 is also decreasing. In this situation, the controller 531 decreases the size of the electrolyzer 521 to attempt to increase efficiency of production of hydrogen by consuming the less available current using a fewer quantity of cells.

Figure 6:
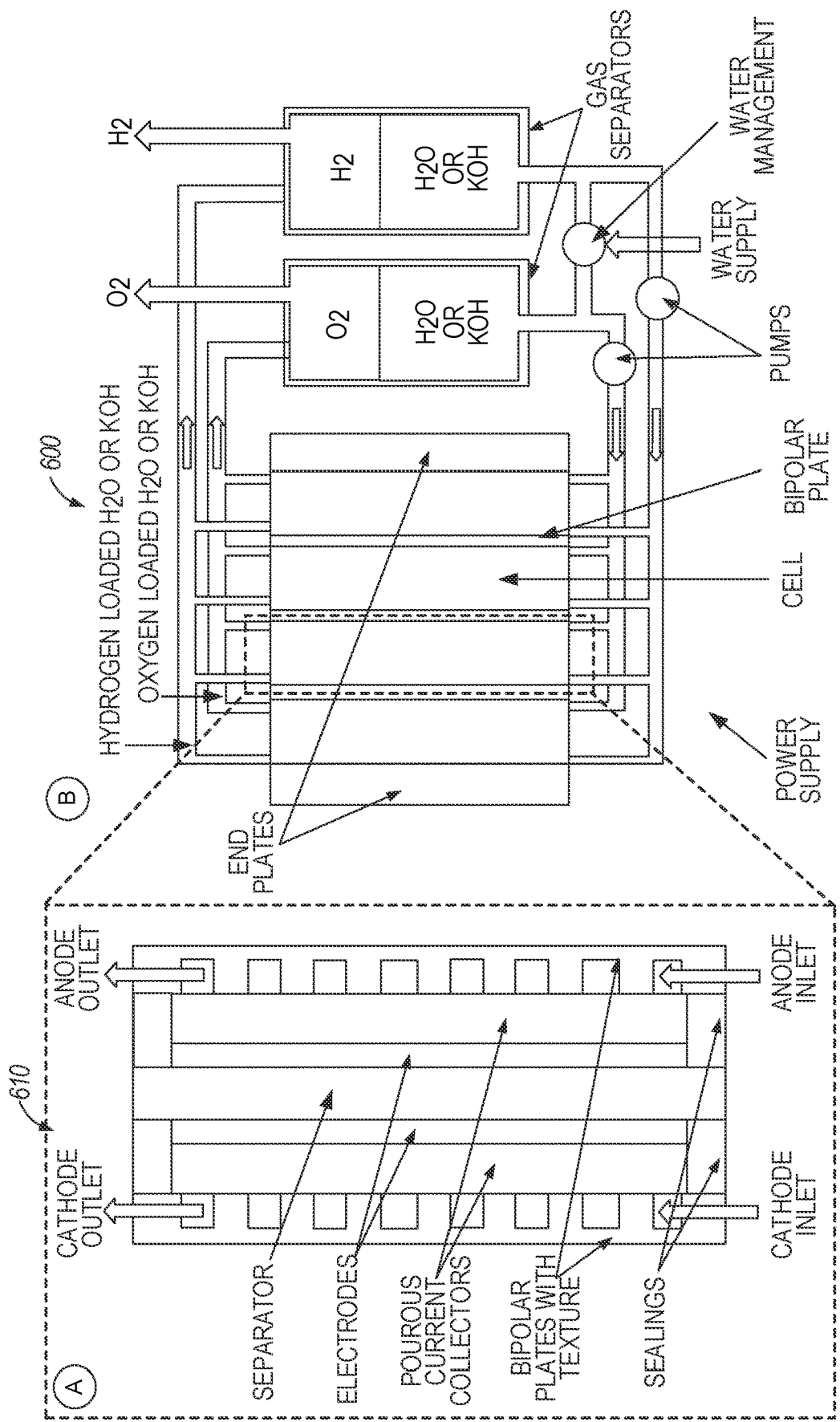
FIG. 6 is a block diagram of an example of an electrolyzer system including series connected electrolyzer cells, in accordance with various embodiments.

In some embodiments, each cell 510 is implemented as a stack of elements that are included between two bipolar plates. An example of a layout of elements of a given cell 510 are shown in FIG. 6. Specifically, as shown in FIG. 6, a set of series connected cells can be included in an electrolyzer 600. The electrolyzer 600 includes similar components as the electrolyzer system 500. The electrolyzer 600 includes a cell 610 that includes a pair of bipolar plates 612. The bipolar plate of one cell 610 can be shared with an adjacent cell 610. The cell 610 includes elements on an interior portion, such as an anode inlet, a cathode inlet, a cathode outlet, an anode outlet, a sealings portion, porous current collectors, electrodes, and a separator.

The bypass circuitry 520 can include a switch coupled between the bipolar plates 612 of a given cell 610. In such implementations, the bypass circuitry 520 is implemented outside or external to the components of the given cell 610. The bypass circuitry 520 is configured to bypass the elements of the given cell 610 when the switch is closed. This causes the given cell 610 to be electrically removed from the series of cells 610 because current is shunted from one bipolar plate to another of the cell 610. Several bypass circuitries 520 can be associated, each with respect to a given one of the many cells 610 of the electrolyzer 600. Any given one of the cells 610 can be electrically removed from the series connection of cells 610 by activating or closing the switch of the bypass circuitry 520 associated with the particular cell 610. While the bipolar plates 612 are shown as being circular, the bipolar plates can be of any suitable shape, such as rectangular or octangular in shape.

Figure 7A:
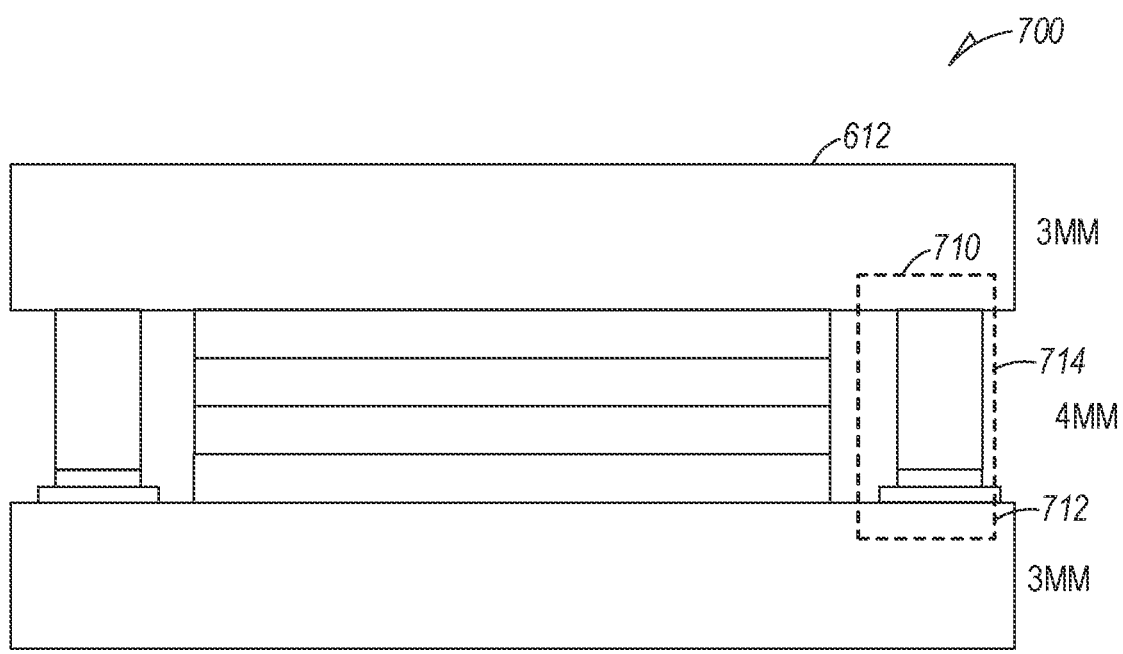
FIGS. 7A and 7B are block diagrams of examples of a bipolar plate, in accordance with various embodiments.

In some implementations, the bypass circuitry 520 can be integrated within each of the cells 610 to avoid implementing or running physical wires around the cells 610. In such cases, the bipolar plates 612 and the sealings portion of the cell 510 are extended to make room for the bypass circuitry 520. FIG. 7A shows a cross-sectional view 700 of the stack of elements of the given cell 610 in such an implementation. As shown, bypass circuitry 710 is placed between the bipolar plates 612 of the given cell 610. The bypass circuitry 710 is disposed around the perimeter of the cell 610 to avoid interfering with water and gas flow among the elements of the cell 610. The bypass circuitry 710 can include a printed circuit board (PCB) 712, system-on-chip, integrated circuit, or some other device on which a processing element is integrated. The PCB 712 (processing element) is coupled to wiring, such as copper 714 or other conductive metal. The PCB 712 (processing element) controls whether current flows from one bipolar plate 612 to another through the copper 714. Namely, when the PCB 712 (processing element) closes a switch, the current flows from one bipolar plate 612 to another through the copper 714 and avoids flowing through other elements of the cell 610.

Figure 7B:
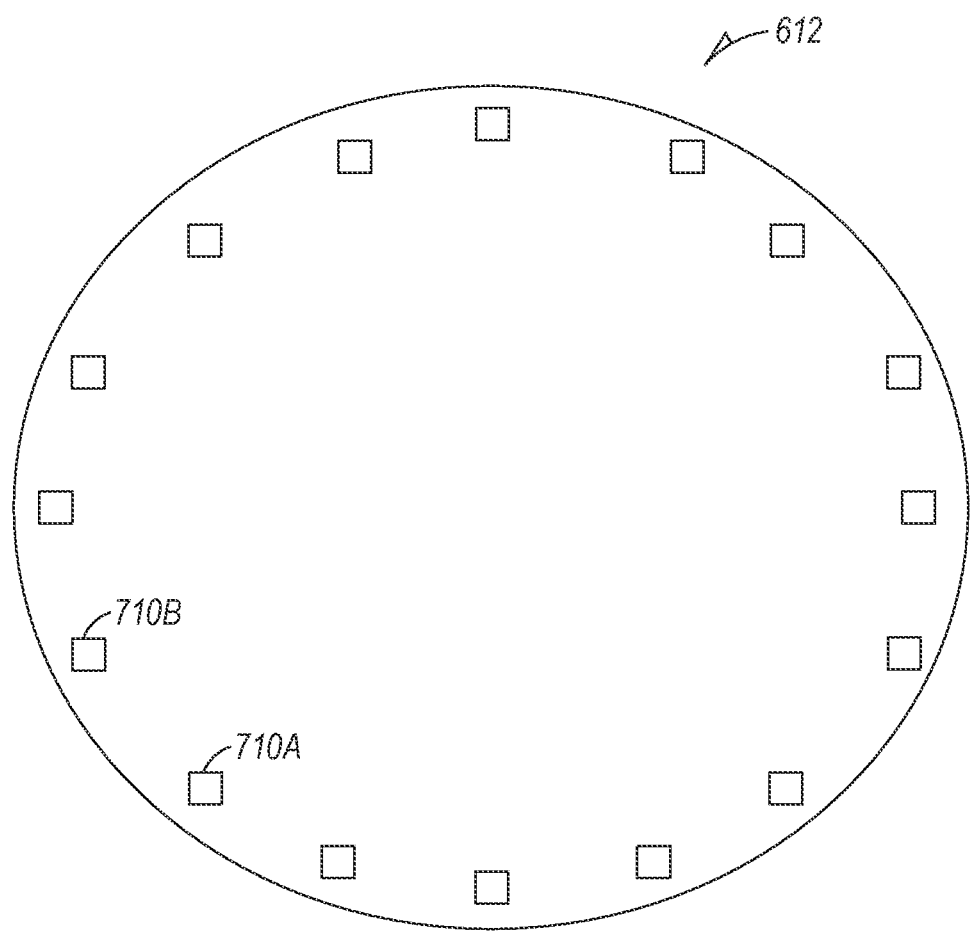

In some cases, multiple bypass circuitries 710 can be disposed around the perimeter of the cell 610. This causes the current flowing between the bipolar plates to be divided among multiple bypass circuitries 710 when the switches of the bypass circuitries 710 are closed. FIG. 7B shows an implementation of the bipolar plates 612 that include multiple bypass circuitries 710A and 710B disposed around the perimeter of the cell 610. In some cases, only a portion of the current may need to be shunted to reduce the overall current flowing through the cell 610. In such cases, a first set of the bypass circuitries 710A can be configured to allow a certain amount of current to flow between the bipolar plates 612 while a remaining amount of current continues to flow through other elements of the cell 610. Specifically, there may be a given amount of current that is received by a given bipolar plate 612, and each bypass circuitry 710A and 710B is only configured to allow flow of a maximum portion of current that is less than the total given amount of current that is received. In such cases, the total given amount of current is divided such that an amount equal to the maximum portion accumulated across the subset of bypass circuitries 710A that are enabled (e.g., in which the switches are closed) flows directly between the bipolar plates 612 while the remaining portion of the given amount of current flows through other elements of the cell 610. In this way, the cell 610 can be partially removed from the series connection of cells 610. As an example, the total given amount of current can be 3 mA and only half of the bypass circuitries 710A and 710B are activated, with each being configured to allow 0.5 mA of current to flow through. In such cases, the 3 mA of total current is divided such that 2 mA accumulated across the subset of bypass circuitries 710A (e.g., half of the bypass circuitries 710A multiplied by 0.5 mA) flows directly between the bipolar plates 612 while the remaining 1 mA portion of the given amount of current flows through other elements of the cell 610.

Figure 8A:
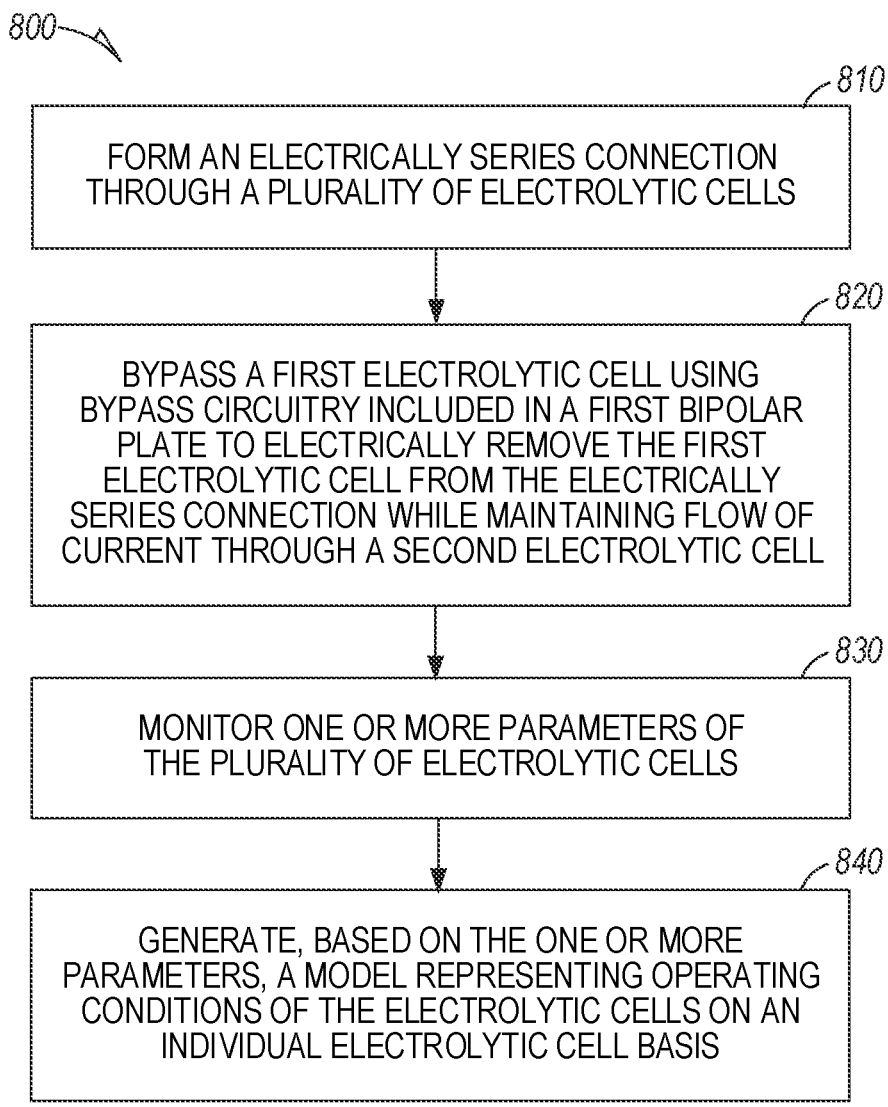
FIG. 8A is a flow diagram depicting example process for operating an electrolyzer, in accordance with various embodiments.

FIG. 8A is a flow diagram depicting example process 800 for operating or configuring an electrolyzer, in accordance with various embodiments. The operations of the process 800 may be performed in parallel or in a different sequence, or may be entirely omitted. In some embodiments, some or all of the operations of the process 800 may be embodied on a computer-readable medium and executed by one or more processors.

At operation 810, an electrolyzer forms an electrical series connection through a plurality of electrolytic cells.

At operation 820, control circuitry bypasses a first electrolytic cell of the plurality of electrolytic cell using bypass circuitry included in a first bipolar plate to electrically remove the first electrolytic cell from the electrical series connection while maintaining flow of current through a second electrolytic cell.

At operation 830, the control circuitry monitors one or more parameters of the plurality of electrolytic cells.

At operation 840, the control circuitry generates a model, based on the one or more parameters, representing operating conditions of the electrolytic cells on an individual electrolytic cell basis.

Figure 8B:
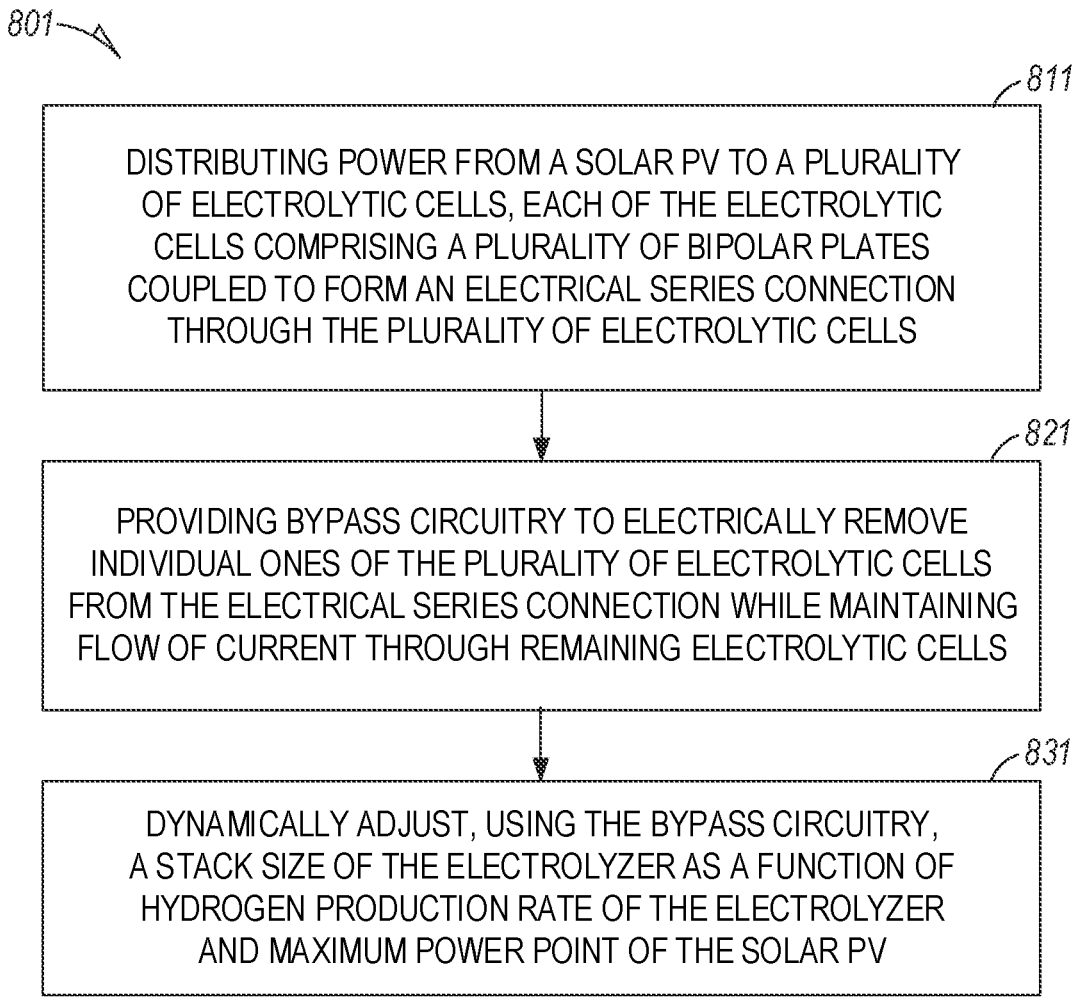
FIG. 8B is a flow diagram depicting example process for operating an electrolyzer coupled to a solar PV, in accordance with various embodiments.

FIG. 8B is a flow diagram depicting example process 801 for operating or configuring an electrolyzer coupled to a solar PV, in accordance with various embodiments. The operations of the process 801 may be performed in parallel or in a different sequence, or may be entirely omitted. In some embodiments, some or all of the operations of the process 801 may be embodied on a computer-readable medium and executed by one or more processors.

At operation 811, a solar PV distributes power to a plurality of electrolytic cells, each of the electrolytic cells comprising a plurality of bipolar plates coupled to form an electrical series connection through a plurality of electrolytic cells.

At operation 821, bypass circuitry is provided to electrically remove individual ones of the plurality of electrolytic cells from the electrical series connections while maintaining flow of current through remaining electrolytic cells.

At operation 831, the control circuitry dynamically adjusts, using the bypass circuitry, a stack size of the electrolyzer as a function of hydrogen production rate of the electrolyzer and maximum power point of the solar PV.

Figure 9:
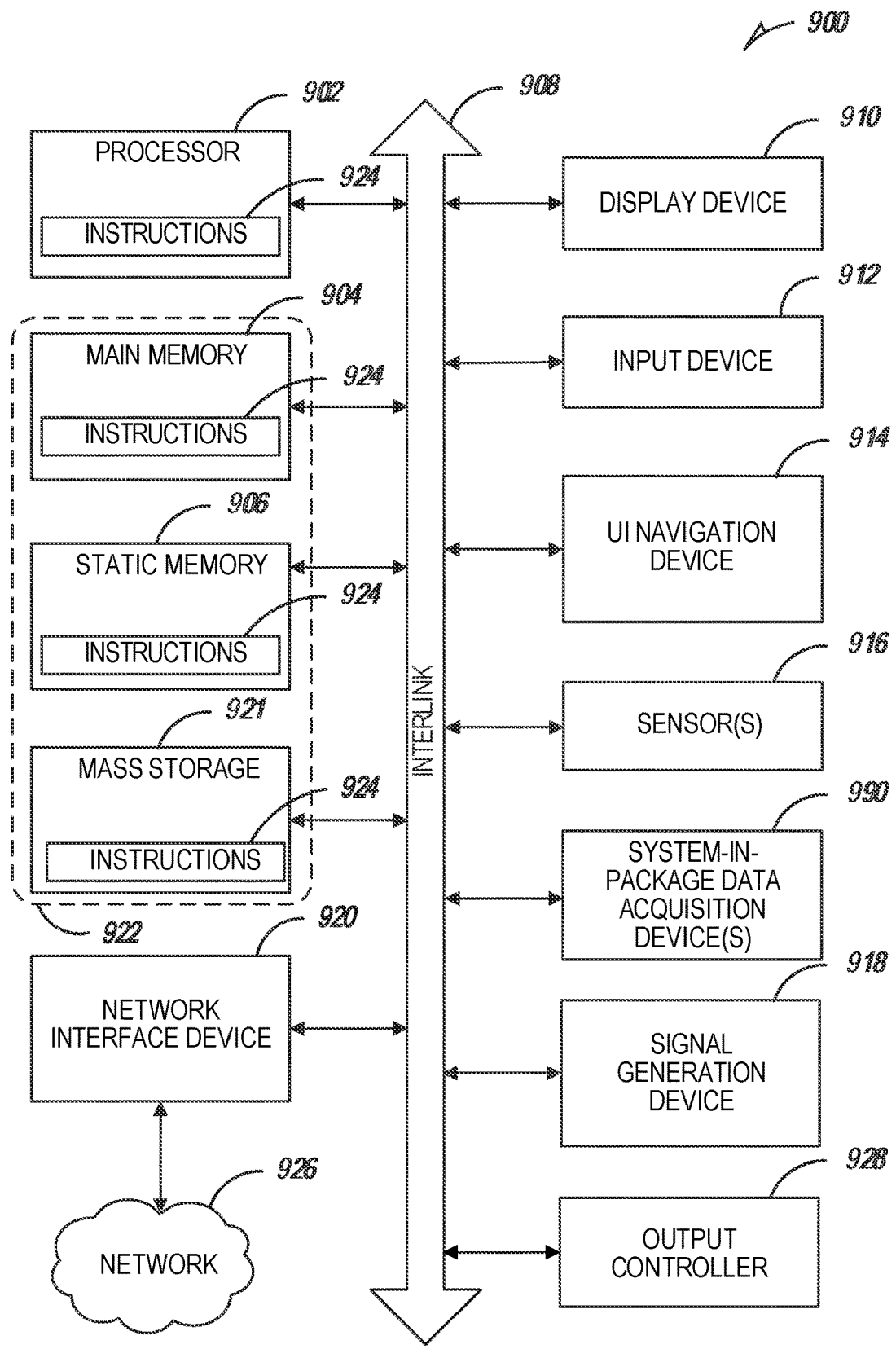
FIG. 9 is a block diagram illustrating an example of a machine upon which one or more embodiments may be implemented.

FIG. 9 is a block diagram of an example machine 900 upon which any one or more of the techniques (e.g., methodologies) discussed herein may be performed. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in a peer-to-peer (P2P) (or other distributed) network environment. The machine 900 may be a personal computer (PC), a tablet PC, a set-top box (STB), a personal digital assistant (PDA), a mobile telephone, a web appliance, an IoT device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa.

The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 900 may include a hardware processor 902 (e.g., a central processing unit (CPU), a graphics processing unit (GPU), a hardware processor core, or any combination thereof, such as a memory controller, etc.), a main memory 904, and a static memory 906, some or all of which may communicate with each other via an interlink (e.g., bus) 908. The machine 900 may further include a display device 910, an alphanumeric input device 912 (e.g., a keyboard), and a user interface (UI) navigation device 914 (e.g., a mouse). In an example, the display device 910, alphanumeric input device 912, and UI navigation device 914 may be a touchscreen display. The machine 900 may additionally include a storage device 922 (e.g., drive unit); a signal generation device 918 (e.g., a speaker); a network interface device 920; one or more sensors 916, such as a Global Positioning System (GPS) sensor, wing sensor, mechanical device sensor, temperature sensor, bridge sensor, audio sensor, industrial sensor, a compass, an accelerometer, or other sensors; and one or more system-in-package data acquisition devices 990. The system-in-package data acquisition device(s) 990 may implement some or all of the functionality of the electrolyzer systems, discussed above. The machine 900 may include an output controller 928, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 922 may include a machine-readable medium on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 922 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 924.

The term "machine-readable medium" may include any transitory or non-transitory medium that is capable of storing, encoding, or carrying transitory or non-transitory instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 (e.g., software, programs, an operating system (OS), etc.) or other data that are stored on the storage device 921 can be accessed by the main memory 904 for use by the hardware processor 902. The main memory 904 (e.g., DRAM) is typically fast, but volatile, and thus a different type of storage from the storage device 921 (e.g., an SSD), which is suitable for long-term storage, including while in an "off" condition. The instructions 924 or data in use by a user or the machine 900 are typically loaded in the main memory 904 for use by the hardware processor 902. When the main memory 904 is full, virtual space from the storage device 921 can be allocated to supplement the main memory 904; however, because the storage device 921 is typically slower than the main memory 904, and write speeds are typically at least twice as slow as read speeds, use of virtual memory can greatly reduce user experience due to storage device latency (in contrast to the main memory 904, e.g., DRAM). Further, use of the storage device 921 for virtual memory can greatly reduce the usable lifespan of the storage device 921.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, P2P networks), among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding, or carrying instructions for execution by the machine 900, and includes digital or analog communications signals or other tangible or intangible media to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended; that is, a system, device, article, composition, formulation, or process that includes elements in addition to those listed after such a term in an aspect are still deemed to fall within the scope of that aspect. Moreover, in the following aspects, the terms "first," "second," "third," and so forth are used merely as labels and are not intended to impose numerical requirements on their objects.

Method examples described herein may be machine- or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly-language code, a higher-level-language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features may be grouped together to streamline the disclosure. This should not be interpreted as intending that a disclosed feature not listed in the list of claims is essential to any aspect. Rather, inventive subject matter may lie in less than all features of a particular disclosed embodiment. Thus, the following aspects are hereby incorporated into the detailed description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

What is claimed is:

1. A system to control an electrolyzer comprising a plurality of electrolytic cells, each of the electrolytic cells comprising a plurality of bipolar plates, the system comprising:
   a voltage converter coupled to form an electrical series connection through the plurality of electrolytic cells and configured to distribute power to the plurality of electrolytic cells, a first bipolar plate of the plurality of bipolar plates of a first electrolytic cell comprising a plurality of bypass circuits configured to electrically remove the first electrolytic cell from the electrical series connection while maintaining flow of current through a second electrolytic cell; and
   control circuitry coupled to the plurality of electrolytic cells, the control circuitry configured to:
   determine a condition corresponding to a need to at least partially remove the first electrolytic cell from the electrical series connection; and
   in response to determining the condition corresponding to the need to at least partially remove the first electrolytic cell, prior to shunting current through first and second bypass circuits of the first electrolytic cell, enable the first bypass circuit of the first electrolytic cell, without enabling the second bypass circuit of the first electrolytic cell, to at least partially selectively initiate electrical removal of the first electrolytic cell from the electrical series connection, the first and second bypass circuits comprising a portion of the plurality of bypass circuits of the same first electrolytic cell.

2. The system of claim 1, further comprising an intermediate distribution device configured to provide an intermediate voltage to the voltage converter.

3. The system of claim 1, wherein the control circuitry is further configured to:
   measure a hydrogen production rate of the electrolyzer; and
   change a stack size of the electrolyzer using the plurality of bypass circuits based on the hydrogen production rate of the electrolyzer and a current output by the electrolyzer.

4. The system of claim 1, wherein the first electrolytic cell comprises a second bipolar plate of the plurality of bipolar plates, a cathode inlet and outlet, an anode inlet and outlet, one or more electrodes, one or more porous current collectors, a separator and a sealings portion, wherein the plurality of bypass circuits is integrated into the first or second bipolar plates.

5. The system of claim 1, wherein the control circuitry is further configured to:
   comparing a hydrogen production rate of the electrolyzer to a peak hydrogen production point; and
   controlling the first and second bypass circuits of the first electrolytic cell in response to comparing of the hydrogen production rate of the electrolyzer to the peak hydrogen production point.

6. The system of claim 5, wherein the control circuitry is further configured to:
computing the peak hydrogen production point of the electrolyzer; and
change a stack size of the electrolyzer based on the hydrogen production rate of the electrolyzer and the computed peak hydrogen production point.

7. The system of claim 1, wherein the plurality of bypass circuits is configured to electrically shunt at least a portion of current flowing through the first bipolar plate when the bypass circuitry is closed to allow current to flow directly from the first bipolar plate to a second bipolar plate, wherein the at least the portion of the current that is electrically shunted comprises alternating current used as a stimulus for electro impedance spectroscopy (EIS).

8. The system of claim 1, wherein the plurality of bypass circuits comprises a plurality of switches distributed along a perimeter of the first bipolar plate, the control circuitry being configured to close a first switch of the plurality of switches without closing a second switch of the plurality of switches.

9. The system of claim 1, wherein the first bypass circuit is configured to allow a first amount of current received by the first bipolar plate, wherein the second bypass circuit is configured to allow a second amount of current received by the first bipolar plate, the first and second amounts of current each being less than a total amount of current received by the first bipolar plate, wherein a quantity of bypass circuits of the plurality of bypass circuits that are enabled is determined as a function of the first amount, the second amount, and a fractional amount of the total amount of current that is computed to be allowed to flow from the first electrolytic cell to the second electrolytic cell.

10. The system of claim 1, wherein the control is configured to:
determine a peak hydrogen production point;
compute a difference between a hydrogen production rate of the electrolyzer at the peak hydrogen production point and a previous hydrogen production rate corresponding to a last time at least a portion of the plurality of bypass circuits were enabled;
in response to determining that the difference is lower than a first threshold and that a change in current output by the electrolyzer is greater than a second threshold, set a state of the at least the portion of the plurality of bypass circuits to a first state to increase a size of the electrolyzer, the first state corresponding to deactivating the at least the portion of the plurality of bypass circuits; and
in response to determining that the difference is lower than the first threshold and that the change in current output by the electrolyzer is lower than a negative of the second threshold, set the state of the at least the portion of the plurality of bypass circuits to a second state to reduce a size of the electrolyzer, the second state corresponding to activating the at least the portion of the plurality of bypass circuits.

11. The system of claim 1, wherein the control is configured to:
determine a peak hydrogen production point;
compute a difference between a hydrogen production rate of the electrolyzer at the peak hydrogen production point and a previous hydrogen production rate of the electrolyzer;
in response to determining that the difference is lower than a threshold, set a state of the at least the portion of the plurality of bypass circuits to a first state; and
in response to determining that the difference is lower than the threshold, set the state of the at least the portion of the plurality of bypass circuits to a second state.

12. The system of claim 11, wherein the control circuitry determines the condition based on one or more parameters that include at least one of voltage across one or more of the plurality of electrolytic cells, electro impedance spectroscopy (EIS), current, temperature, and gas or fluid flow associated with the one or more of the plurality of electrolytic cells.

13. The system of claim 1, wherein the first bipolar plate is coupled to one or more conductors, wherein the plurality of bypass circuits comprises one or more switches that, when closed, are configured to shunt current through the one or more conductors to electrically remove the first electrolytic cell from the electrical series connection.

14. The system of claim 1, wherein the first of the electrolytic cells includes a first controller and the second of the electrolytic cells includes a second controller, wherein the first controller generates a model representing an operating condition of the first electrolytic cell based on one or more parameters of the first electrolytic cell.

15. A system that operates with a renewable energy source, the system comprising:
an electrolyzer couplable to the renewable energy source to distribute power from the renewable energy source to a plurality of electrolytic cells of the electrolyzer, each of the electrolytic cells comprising a plurality of bipolar plates coupled to form an electrical series connection through the plurality of electrolytic cells, the electrolyzer comprising bypass circuitry to electrically remove individual ones of the plurality of electrolytic cells from the electrical series connection while maintaining flow of current through remaining electrolytic cells; and
control circuitry, coupled to the plurality of electrolytic cells and the renewable energy source, to dynamically adjust a stack size of the electrolyzer as a function of a hydrogen production rate of the electrolyzer and a maximum power point of the renewable energy source, a first electrolytic cell of the plurality of electrolytic cells comprising a plurality of bypass circuits, and wherein the control circuitry is configured to, prior to shunting current through first and second bypass circuits of the first electrolytic cell, enable the first bypass circuit of the plurality of bypass circuits, without enabling the second bypass circuit of the plurality of bypass circuits of the first electrolytic cell, to at least partially selectively initiate electrical removal of the first electrolytic cell from the electrical series connection in response to determining a condition corresponding to a need to at least partially remove the first electrolytic cell from the electrical series connection.

16. The system of claim 15, wherein the control circuitry:
tracks the maximum power point of the renewable energy source over time;
obtains a hydrogen production rate of the electrolyzer;
determines electrolyzer health data associated with the electrolyzer; and
selects a subset of the plurality of electrolytic cells to bypass using the bypass circuitry in order to adjust the stack size of the electrolyzer to increase the hydrogen production rate.

17. The system of claim 16, wherein the control circuitry increases the hydrogen production rate in accordance with: increasing (H), $H=\eta(I)*I*V=I*V_{TH}$, where H is the hydrogen production rate, h(I) is an electrolyzer stack efficiency as a function of current I, I is the electrolyzer stack current, V is a voltage of the electrolyzer stack, VTH is a thermoneutral voltage, and wherein the control circuitry:
  determines a peak hydrogen production point;
  measures the hydrogen production rate of the electrolyzer at the peak hydrogen production point;
  computes a difference between the hydrogen production rate of the electrolyzer at the peak hydrogen production point and a previous hydrogen production rate corresponding to a last change in the stack size of the electrolyzer;
  compares the difference to a first threshold and a change in current output by the renewable energy source to a second threshold;
  in response to determining that the difference is lower than the first threshold and that the change in current output by the renewable energy source is greater than the second threshold, increases the stack size of the electrolyzer; and
  in response to determining that the difference is lower than the first threshold and that the change in current output by the renewable energy source is lower than a negative of the second threshold, decreases the stack size of the electrolyzer.

18. An apparatus for operating a system that includes an electrolyzer comprising a plurality of electrolytic cells coupled through an electrically series connection, the apparatus comprising:
  a first bipolar plate implemented on a first of the plurality of electrolytic cells;
  a plurality of bypass circuits implemented on the first bipolar plate of the same first electrolytic cell;
  control circuitry coupled to the first bipolar plate and the plurality of by pass circuits for electrically removing the first electrolytic cell from the electrically series connection while maintaining flow of current through a second electrolytic cell of the plurality of electrolytic cells, prior to shunting current through first and second bypass circuits of the first electrolytic cell, control circuitry enabling the first bypass circuit of the plurality of bypass circuits, without enabling the second bypass circuit of the plurality of bypass circuits of the first electrolytic cell, to at least partially initiate electrical removal of the first electrolytic cell from the electrically series connection in response to determining a condition corresponding to a need to at least partially remove the first electrolytic cell from the electrical series connection; and
  a second bipolar plate selectively coupled to the first bipolar plate through the plurality of bypass circuits.

19. The apparatus of claim 18, comprising the control circuitry that measures a hydrogen production rate of the electrolyzer; and changes a stack size of the electrolyzer using the plurality of bypass circuits based on the hydrogen production rate of the electrolyzer and a current output by the electrolyzer.

20. The apparatus of claim 18, wherein the first electrolytic cell comprises a second bipolar plate of the plurality of bipolar plates, a cathode inlet and outlet, an anode inlet and outlet, one or more electrodes, one or more porous current collectors, and a separator, wherein the plurality of bypass circuits is integrated into the first or second bipolar plates.

* * * * *